(12) United States Patent
Nishiguchi et al.

(10) Patent No.: US 11,192,984 B2
(45) Date of Patent: *Dec. 7, 2021

(54) HEAT-RESISTANT CROSSLINKED FLUOROCARBON RUBBER FORMED BODY AND METHOD FOR PRODUCING THE SAME, SILANE MASTER BATCH, MASTER BATCH MIXTURE AND FORMED BODY THEREOF, AND HEAT-RESISTANT PRODUCT

(71) Applicant: FURUKAWA ELECTRIC CO., LTD., Tokyo (JP)

(72) Inventors: Masaki Nishiguchi, Tokyo (JP); Arifumi Matsumura, Tokyo (JP); Hidekazu Hara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,246

(22) Filed: Aug. 9, 2018

(65) Prior Publication Data

US 2018/0346664 A1 Dec. 6, 2018

Related U.S. Application Data

(63) Continuation of application No. PCT/JP2017/004946, filed on Feb. 10, 2017.

(30) Foreign Application Priority Data

Feb. 12, 2016 (JP) ................................. 2016-024490

(51) Int. Cl.
| | |
|---|---|
| *C08L 33/10* | (2006.01) |
| *C08J 3/22* | (2006.01) |
| *C08L 23/08* | (2006.01) |
| *C08K 3/36* | (2006.01) |
| *C08K 3/34* | (2006.01) |
| *C08K 5/14* | (2006.01) |
| *H01B 3/44* | (2006.01) |

(Continued)

(52) U.S. Cl.
CPC ................ *C08J 3/22* (2013.01); *B29B 7/005* (2013.01); *B29B 7/183* (2013.01); *B29B 7/7495* (2013.01); *B29B 7/90* (2013.01); *C08J 3/247* (2013.01); *C08K 3/013* (2018.01); *C08K 3/346* (2013.01); *C08K 3/36* (2013.01); *C08K 5/14* (2013.01); *C08K 5/54* (2013.01); *C08K 5/5419* (2013.01); *C08L 23/0853* (2013.01); *C08L 27/12* (2013.01); *C08L 27/18* (2013.01); *C08L 33/10* (2013.01); *H01B 3/28* (2013.01); *H01B 3/445* (2013.01); *H01B 3/447* (2013.01); *H01B 3/448* (2013.01); *B29B 7/007* (2013.01); *B29B 7/40* (2013.01); *B29B 7/46* (2013.01); *C08F 2800/20* (2013.01); *C08J 2327/16* (2013.01); *C08J 2327/18* (2013.01); *C08K 2003/2296* (2013.01); *C08K 2003/265* (2013.01); *C08L 27/16* (2013.01); *C08L 2310/00* (2013.01); *C08L 2312/00* (2013.01)

(58) Field of Classification Search
CPC . C08J 3/247; C08J 3/22; C08J 2327/18; C08J 2327/16; C08L 27/18; C08L 23/0853; C08L 23/10; C08L 2310/00; C08L 27/16; C08L 2312/00; H01B 3/28; H01B 3/448; H01B 3/445; H01B 3/447; B29B 7/7495; B29B 7/183; B29B 7/005; B29B 7/90; B29B 7/40; B29B 7/007; C08K 3/36; C08K 3/346; C08K 5/14; C08K 5/5419; C08K 3/013; C08K 2003/2296; C08K 2003/265; C08F 2800/20
See application file for complete search history.

(56) References Cited

U.S. PATENT DOCUMENTS 4,575,537 A * 3/1986 Ueno .................... B29C 61/003
525/199
2009/0011164 A1 1/2009 Masuda et al.
(Continued)

FOREIGN PATENT DOCUMENTS

CN 101412835 A * 4/2009
JP 05-303909 11/1993
(Continued)

OTHER PUBLICATIONS

International Search Report dated Mar. 28, 2017 in PCT/JP2017/004946 filed Feb. 10, 2017 (with English Translation).

(Continued)

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

A method for producing a heat-resistant crosslinked fluorocarbon rubber formed body, comprising: (a) a step of melt-kneading 0.003 to 0.5 part by mass of an organic peroxide, 0.5 to 400 parts by mass of an inorganic filler, and more than 2.0 parts by mass and 15.0 parts by mass or less of a silane coupling agent, with respect to 100 parts by mass of a base rubber containing a fluorocarbon rubber, at a temperature equal to or higher than a decomposition temperature of the organic peroxide, to prepare a silane master batch; a heat-resistant crosslinked fluorocarbon rubber formed body obtained by the method, a silane master batch, a mixture and a formed body thereof, and a heat-resistant product.

20 Claims, No Drawings

(51) Int. Cl.
*C08K 5/5419* (2006.01)
*B29B 7/74* (2006.01)
*C08J 3/24* (2006.01)
*C08K 5/54* (2006.01)
*C08K 3/013* (2018.01)
*B29B 7/18* (2006.01)
*C08L 27/18* (2006.01)
*B29B 7/90* (2006.01)
*C08L 27/12* (2006.01)
*B29B 7/00* (2006.01)
*H01B 3/28* (2006.01)
*C08L 27/16* (2006.01)
*C08K 3/22* (2006.01)
*C08K 3/26* (2006.01)
*B29B 7/40* (2006.01)
*B29B 7/46* (2006.01)

(56) References Cited

U.S. PATENT DOCUMENTS

2013/0150512 A1* 6/2013 Mihara et al. ........ B60C 1/0016
524/285

2016/0194491 A1 7/2016 Taguchi et al.
2018/0346702 A1* 12/2018 Nishiguchi et al. ... H01B 3/006

FOREIGN PATENT DOCUMENTS

| | | |
|---|---|---|
| JP | 08-077837 | 3/1996 |
| JP | 08-143736 | 6/1996 |
| JP | 10-180836 | 7/1998 |
| JP | 2000-072902 | 3/2000 |
| JP | 2001-101928 | 4/2001 |
| JP | 2011-018634 | 1/2011 |
| JP | 2012-074182 | 4/2012 |
| JP | 2015-146303 | 8/2015 |
| WO | WO 2006/057331 A1 | 6/2006 |
| WO | WO 2015/046176 A1 | 4/2015 |
| WO | WO 20151046476 | 4/2015 |

OTHER PUBLICATIONS

Office Action dated Jun. 2, 2020, in Japanese Patent Application No. 2017-567012 filed Feb. 10, 2017 w/English translation.

* cited by examiner

HEAT-RESISTANT CROSSLINKED FLUOROCARBON RUBBER FORMED BODY AND METHOD FOR PRODUCING THE SAME, SILANE MASTER BATCH, MASTER BATCH MIXTURE AND FORMED BODY THEREOF, AND HEAT-RESISTANT PRODUCT

CROSS-REFERENCE TO RELATED APPLICATIONS

This application is a Continuation of PCT International Application No. PCT/JP2017/004946 filed on Feb. 10, 2017, which claims priority under 35 U.S.C. § 119 (a) to Japanese Patent Application No. 2016-024490 filed in Japan on Feb. 12, 2016. Each of the above applications is hereby expressly incorporated by reference, in its entirety, into the present application.

TECHNICAL FIELD

The present invention relates to a heat-resistant crosslinked fluorocarbon rubber formed body and a method for producing the same, a silane master batch, a master batch mixture and a formed body thereof, and a heat-resistant product.

BACKGROUND ART

Wiring materials such as insulated wires, cables, cords, optical fiber core wires or optical fiber cords (optical fiber cables), used in an electrical and electronic equipment field and an industrial field are required to have various characteristics such as flame retardancy, heat resistance and mechanical characteristics (for example, tensile properties and abrasion resistance).

In addition, these wiring materials are heated to 80 to 105° C., and further to about 125° C., still further to 150° C. or more, depending on the use and the like, by use for a long period of time, and are required to have heat resistance thereto in several cases. In such a case, a rubber material or a crosslinked material is used as the wiring material. As a method for crosslinking rubber, a chemical crosslinking method is generally employed, and when the crosslinked material is produced, an electron beam crosslinking method or a chemical crosslinking method is employed.

Conventionally, as methods for crosslinking polyolefin resins such as polyethylene, known so far include: electron beam crosslinking methods in which the resin is crosslinked by irradiation with electron beams, and chemical crosslinking methods, such as a crosslinking method in which heat is applied after forming, to decompose organic peroxide or the like and to allow a crosslinking reaction, and a silane crosslinking method.

The silane crosslinking method means a method of obtaining a crosslinked resin, by obtaining a silane-grafted resin by allowing a grafting reaction of a silane coupling agent having an unsaturated group with a resin in the presence of organic peroxide, and then bringing the silane-grafted resin into contact with moisture in the presence of a silanol condensation catalyst.

Among the above-described crosslinking methods, in particular, the silane crosslinking method requires no special facilities in many cases, and therefore can be employed in a wide range of fields.

As the silane crosslinking method for polyolefin resins, for example, Patent Literature 1 proposes a method of sufficiently melt-kneading an inorganic filler subjected to surface treatment with a silane coupling agent; a silane coupling agent, an organic peroxide, and a crosslinking catalyst to a polyolefin-based resin, by a kneader, and then forming the resultant material by a single screw extruder.

Incidentally, heat resistance higher than the above-described heat resistance is required for electric wire members or the like used in microwave ovens or gas ranges, or heat-resistant parts or the like of automobiles among the above-described wiring materials. As a resin that may meet this requirement, fluorocarbon rubber that may exhibit a heat-resistant temperature of 200° C. or higher is widely used in the above-described electric wire members or the like.

However, crosslinked rubber is desirable also in the fluorocarbon rubber in a manner similar to the above-described polyolefin resin, and as the crosslinking method, the electron beam crosslinking method or the chemical crosslinking method using the organic peroxide is widely employed.

It is more difficult to allow silane crosslinking of the fluorocarbon rubber than allowing silane crosslinking of the above-described polyolefin resin, according to the silane crosslinking method. A crosslinked body of the fluorocarbon rubber is unable to be obtained merely by allowing a silane grafting reaction of the silane coupling agent having the unsaturated group with the fluorocarbon rubber in the presence of organic peroxide to obtain a silane-grafted resin, and then bringing the silane-grafted resin into contact with moisture in the presence of the silanol condensation catalyst.

CITATION LIST

Patent Literatures

Patent Literature 1: JP-A-2001-101928 ("JP-A" means unexamined published Japanese patent application)

SUMMARY OF INVENTION

Technical Problem

When a silane grafting reaction is performed by using a kneader or a Banbury mixer in the above-described silane crosslinking method of polyolefin resins, the silane coupling agent having an unsaturated group generally has high volatility and has a problem of causing volatilization before performing the silane grafting reaction. Therefore, it has been difficult to prepare a desired silane crosslinked master batch containing the silane-grafted resin.

Further, in the method described in Patent Literature 1, a resin is crosslinked during melt-kneading by a kneader or the like in several cases. Furthermore, most of a silane coupling agent other than the silane coupling agent applied to surface treatment of an inorganic filler is volatilized or causes condensation with each other in several cases. Therefore, an electric wire having desired heat resistance is unable to be obtained. In addition thereto, outer appearance of the electric wire obtained is deteriorated by a condensation reaction between the silane coupling agents in several cases.

The present invention aims to solve the above-described problems, and is contemplated for providing a heat-resistant crosslinked fluorocarbon rubber formed body, which is excellent in heat resistance and is not melted even at a high temperature, and a method for producing the same.

In addition, the present invention is contemplated for providing a silane master batch or a master batch mixture, from which the heat-resistant crosslinked fluorocarbon rubber formed body can be formed, and a formed body thereof.

Further, the present invention is contemplated for providing a heat-resistant product containing the heat-resistant crosslinked fluorocarbon rubber formed body obtained according to the production method for the heat-resistant crosslinked fluorocarbon rubber formed body.

Solution to Problem

The present inventors found that a heat-resistant crosslinked fluorocarbon rubber formed body which is excellent in heat resistance and is not melted even at a high temperature can be produced according to a specific production method in which a silane master batch prepared by melt-mixing a base rubber containing a fluorocarbon rubber; an inorganic filler and a silane coupling agent is mixed at a specific ratio, with a silanol condensation catalyst in a silane crosslinking method.

The present inventors have further continued research based on this finding, and have completed the present invention.

The above-described problems of the present invention can be solved by the following means.

<1> A method for producing a heat-resistant crosslinked fluorocarbon rubber formed body, comprising:
(a) a step of melt-kneading 0.003 to 0.5 part by mass of organic peroxide, 0.5 to 400 parts by mass of an inorganic filler, and more than 2.0 parts by mass and 15.0 parts by mass or less of a silane coupling agent, with respect to 100 parts by mass of a base rubber containing a fluorocarbon rubber, at a temperature equal to or higher than a decomposition temperature of the organic peroxide, to prepare a silane master batch;
(b) a step of mixing the silane master batch obtained in the step (a) with a silanol condensation catalyst, and then forming the resultant mixture; and
(c) a step of bringing the formed body obtained in the step (b) into contact with moisture, to cause silane crosslinking.

<2> The method for producing the heat-resistant crosslinked fluorocarbon rubber formed body described in the item <1>, wherein the base rubber contains a resin of an ethylene-vinyl acetate copolymer, a resin of an ethylene-(meth)acrylate copolymer or a resin of an ethylene-(meth)acrylic acid copolymer, or an acrylic rubber, or any combination of these.

<3> The method for producing the heat-resistant crosslinked fluorocarbon rubber formed body described in the item <1> or <2>, wherein the fluorocarbon rubber is tetrafluoroethylene-propylene copolymer rubber.

<4> The method for producing the heat-resistant crosslinked fluorocarbon rubber formed body described in any one of the items <1> to <3>, wherein a content of the organic peroxide is 0.005 to 0.5 part by mass.

<5> The method for producing the heat-resistant crosslinked fluorocarbon rubber formed body described in any of the items <1> to <4>, wherein a content of the silane coupling agent is 3 to 12.0 parts by mass.

<6> The method for producing the heat-resistant crosslinked fluorocarbon rubber formed body described in any one of the items <1> to <5>, wherein a content of the silane coupling agent is 4 to 12.0 parts by mass.

<7> The method for producing the heat-resistant crosslinked fluorocarbon rubber formed body described in any one of the items <1> to <6>, wherein the silane coupling agent is vinyltrimethoxysilane or vinyltriethoxysilane.

<8> The method for producing the heat-resistant crosslinked fluorocarbon rubber formed body described in any one of the items <1> to <7>, wherein the inorganic filler is silica, calcium carbonate, zinc oxide or calcined clay, or any combination of these.

<9> The method for producing the heat-resistant crosslinked fluorocarbon rubber formed body described in any one of the items <1> to <8>, wherein melt-kneading in the step (a) is performed by using an enclosed mixer.

<10> The method for producing the heat-resistant crosslinked fluorocarbon rubber formed body described in any one of the items <1> to <9>, wherein a fluorocarbon resin is contained in the base rubber.

<11> The method for producing the heat-resistant crosslinked fluorocarbon rubber formed body described in any one of the items <1> to <10>, wherein part of the base rubber is melt-mixed in the step (a), a remainder of the base rubber is mixed in the step (b), and a fluorocarbon resin is contained in the remainder of the base rubber.

<12> The method for producing the heat-resistant crosslinked fluorocarbon rubber formed body described in the item <10> or <11>, wherein a melting point of the fluorocarbon resin is 250° C. or lower.

<13> The method for producing the heat-resistant crosslinked fluorocarbon rubber formed body described in any one of the items <10> to <12>, wherein a melting point of the fluorocarbon resin is 200° C. or lower.

<14> The method for producing the heat-resistant crosslinked fluorocarbon rubber formed body described in any one of the items <10> to <13>, wherein the fluorocarbon resin contains an ethylene-tetrafluoroethylene-hexafluoropropylene copolymer resin, an ethylene-tetrafluoroethylene copolymer resin or a polyvinylidene fluoride resin, or any combination of these.

<15> The method for producing the heat-resistant crosslinked fluorocarbon rubber formed body described in any one of the items <10> to <14>, wherein a percentage content of the fluorocarbon resin is 3 to 45% by mass in 100% by mass of the base rubber.

<16> A silane master batch, for use in producing a master batch mixture prepared by mixing 0.003 to 0.5 part by mass of organic peroxide, 0.5 to 400 part by mass of an inorganic filler, more than 2.0 parts by mass and 15.0 parts by mass or less of a silane coupling agent, with respect to 100 parts by mass of a base rubber containing a fluorocarbon rubber, and a silanol condensation catalyst, wherein the silane master batch is obtained by melt-kneading all or part of the base rubber, the organic peroxide, the inorganic filler and the silane coupling agent, at a temperature equal to or higher than a decomposition temperature of the organic peroxide.

<17> A master batch mixture, comprising the silane master batch described in the item <16> and a silanol condensation catalyst.

<18> A formed body, formed by introducing the master batch mixture obtained by dry-blending the silane master batch described in the item <16> and a silanol condensation catalyst, into a forming machine.

<19> A heat-resistant crosslinked fluorocarbon rubber formed body, produced according to the method for producing the heat-resistant crosslinked fluorocarbon rubber formed body described in any one of the items <1> to <15>.

<20> The heat-resistant crosslinked fluorocarbon rubber formed body described in the item <19>, formed by crosslinking the base rubber with the inorganic filler through a silanol bond.

<21> A heat-resistant product, comprising the heat-resistant crosslinked fluorocarbon rubber formed body described in the item <19> or <20>.

<22> The heat-resistant product described in the item <21>, wherein the heat-resistant crosslinked fluorocarbon rubber formed body is a coating of an electric wire or an optical fiber cable.

Note that, in this specification, numerical expressions in a style of " . . . to . . . " will be used to indicate a range including the lower and upper limits represented by the numerals given before and after "to", respectively.

Advantageous Effects of Invention

The present invention can overcome problems of the existing methods described above, and can efficiently produce a heat-resistant crosslinked fluorocarbon rubber formed body which is excellent in heat resistance and is not melted even at a high temperature, and a heat-resistant product containing the formed body, by mixing an inorganic filler and a silane coupling agent before kneading and/or during kneading with a base rubber containing a fluorocarbon rubber, thereby suppressing volatilization of the silane coupling agent during kneading. Further, even if a large amount of the inorganic filler is added thereto, a high heat-resistant crosslinked fluorocarbon rubber formed body can be produced without using a special machine such as a chemical crosslinking machine, and an electron beam crosslinking machine.

Accordingly, the present invention can provide such a heat-resistant crosslinked fluorocarbon rubber formed body which is excellent in heat resistance and is not melted even at a high temperature, and a method for producing the same. In addition, the present invention can provide a silane master batch or a master batch mixture, from which the heat-resistant crosslinked fluorocarbon rubber formed body can be formed, and a formed body thereof. Furthermore, the present invention can provide a heat-resistant product containing the above-described heat-resistant crosslinked fluorocarbon rubber formed body.

Other and further features and advantages of the invention will appear more fully from the following description.

MODE FOR CARRYING OUT THE INVENTION

First, each component to be used in the present invention will be explained.

<Base Rubber>

Base rubber used in the present invention contains a fluorocarbon rubber as an essential component. If the base rubber contains fluorine-containing rubber, a heat-resistant crosslinked fluorocarbon rubber formed body can be provided with excellent flexibility, heat resistance, and oil resistance, and further heat resistance without causing melting even at a high temperature. Here, the heat resistance without causing melting even at a high temperature means properties that do not cause melting preferably at a temperature of 200° C., and more preferably at a temperature of 200° C. or higher. The above-described temperature has no upper limit, and 300° C. or lower is practical. In addition, when necessary, the formed body can be provided with a long-term heat resistance at a temperature higher than 150° C.

The fluorocarbon rubber is not particularly limited, and ordinary rubber that has been used so far in a heat-resistant rubber formed body can be used.

Specific examples of such fluorocarbon rubber include rubber having a site capable of a grafting reaction with a grafting reaction site of a silane coupling agent in the presence of organic peroxide, for example, an unsaturated bond site of a carbon chain, or a carbon atom having a hydrogen atom in a main chain or at a terminal thereof.

In addition, specific examples of the fluorocarbon rubber include homopolymer rubber or copolymer rubber, containing a fluorine atom in a main chain or a side chain. The fluorocarbon rubber can be ordinarily obtained by polymerizing (copolymerizing) a monomer containing a fluorine atom.

Such fluorocarbon rubber is not particularly limited, and specific examples thereof include copolymer rubber between fluorine-containing monomers such as perfluorohydrocarbon including tetrafluoroethylene and hexafluoropropylene, and partially fluorinated hydrocarbon including vinylidene fluoride, and further copolymer rubber between such a fluorine-containing monomer and hydrocarbon such as ethylene and/or propylene.

Specific examples include tetrafluoroethylene-propylene copolymer rubber (FEPM), tetrafluoroethylene-fluoropropylene (for example, hexafluoropropylene) copolymer rubber, tetrafluoroethylene-perfluorovinyl ether copolymer rubber (FFKM), vinylidene fluoride rubber (FKM, for example, vinylidene fluoride-hexafluoropropylene copolymer rubber).

Furthermore, specific examples thereof also include copolymer rubber between the above-mentioned fluorine-containing monomer and chloroprene and/or chlorosulfonated polyethylene.

Among these fluorocarbon rubbers, tetrafluoroethylene-propylene copolymer rubber or vinylidene fluoride-hexafluoropropylene copolymer rubber is preferable, and tetrafluoroethylene-propylene copolymer rubber is more preferable.

A content of the fluorine atom in the fluorocarbon rubber (mass ratio of the fluorine atom with regard to the total amount of the fluorocarbon rubber) is not particularly limited, and is preferably 25% by mass or more, more preferably 40% by mass or more, and further preferably 50% by mass or more. An upper limit of the fluorine content is a mass ratio when all of hydrogen atoms of a polymer before being fluorinated, and capable of being replaced by the fluorine atom are replaced by the fluorine atom, and is unable to be unambiguously determined as this varies depending on a molecular weight of the polymer before being fluorinated, the number of hydrogen atoms that can be replaced by the fluorine atom, or the like. For example, the upper limit can be taken as 75% by mass.

In the present invention, the fluorine content is determined according to a calculated value during synthesis, or a potassium carbonate pyrohydrolysis method. Specific examples of the potassium carbonate pyrohydrolysis method include the method described in Makoto Noshiro et al., NIPPON KAGAKU KAISHI, 6, 1236 (1973).

The fluorocarbon rubber may be appropriately synthesized, or a commercially available product may be used.

Specific examples of the tetrafluoroethylene-propylene copolymer rubber (FEPM) include AFLAS (trade name, manufactured by Asahi Glass Co., Ltd.). Specific examples of the tetrafluoroethylene-perfluorovinyl ether copolymer rubber (FFKM) include Kalrez (trade name, manufactured by E. I. du Pont de Nemours and Company). Specific examples of the vinylidene fluoride rubber (FKM) include Viton (trade name, manufactured by E. I. du Pont de Nemours and Company), DAI-EL (trade name, manufactured by Daikin Industries, Ltd.), Dyneon (trade name, manufactured by 3M Company) and Tecnoflon (trade name, manufactured by Solvay S.A.).

In the present invention, the base rubber may contain any other resin or rubber, an oil component or the like, in addition to the fluorocarbon rubber.

In this case, in the base rubber, a percentage content of each component is appropriately determined to be 100% by mass in a total of each component. For example, a percentage content of the fluorocarbon rubber in the base rubber is preferably 30 to 100% by mass, and more preferably 50 to 100% by mass. If this percentage content is excessively small, the formed body is unable to be provided with the heat resistance, furthermore, the oil resistance or the like in several cases.

As any other resin or rubber, each resin of an ethylene-vinyl acetate copolymer, an ethylene-(meth)acrylate copolymer and an ethylene-(meth)acrylic acid copolymer, or acrylic rubber or the like is preferable. One kind or two or more kinds thereof can be simultaneously used.

Strength, abrasion resistance or formability is improved by mixing such a resin or rubber. As such a resin or rubber, each resin of an ethylene-vinyl acetate copolymer, an ethylene-methyl acrylate copolymer, an ethylene-ethyl acrylate copolymer and an ethylene-butyl acrylate copolymer, or acrylic rubber is more preferable, and a resin of an ethylene-vinyl acetate copolymer, or acrylic rubber is further preferable.

Each resin or rubber described above is not particularly limited, and a resin or rubber appropriately synthesized or a commercially available product can be used.

A percentage content of such a resin or rubber is preferably 0 to 45% by mass, more preferably 0 to 35% by mass, and further preferably 10 to 30% by mass, in a base rubber component. If the above-described content is within the above-described range, further excellent heat resistance is exhibited.

In the present invention, the base rubber may be a material containing a chlorine-containing resin (resin specified in JIS K7229-1995) in addition to the fluorocarbon rubber, or may be a material without containing the chlorine-containing resin such as chlorinated polyethylene or chloroprene rubber.

In addition, as any other resin described above, the fluorocarbon resin can also be preferably used. Mechanical strength or the abrasion resistance of the heat-resistant crosslinked fluorocarbon rubber formed body can be improved by mixing the fluorocarbon resin.

Specific examples of the fluorocarbon resin include a resin of a homopolymer or a copolymer, containing a fluorine atom in a main chain or a side chain. The fluorocarbon resin can be ordinarily obtained by polymerizing (copolymerizing) a monomer containing the fluorine atom.

Such a fluorocarbon resin is not particularly limited, and specific examples thereof include a resin of a copolymer between fluorine-containing monomers, such as perfluorohydrocarbon including tetrafluoroethylene and hexafluoropropylene, and partially fluorinated hydrocarbon including vinylidene fluoride, and a resin of a copolymer between such a fluorine-containing monomer and hydrocarbon such as ethylene and/or propylene.

Specific examples thereof include a tetrafluoroethylene-hexafluoropropylene copolymer resin, a tetrafluoroethylene-perfluoroalkyl ether copolymer resin, an ethylene-tetrafluoroethylene copolymer resin, an ethylene-tetrafluoroethylene-hexafluoropropylene copolymer resin, a chlorotrifluoroethylene resin and a polyvinylidene fluoride resin. Above all, an ethylene-tetrafluoroethylene-hexafluoropropylene copolymer resin, an ethylene-tetrafluoroethylene copolymer resin or a polyvinylidene fluoride resin, or any combination thereof is preferable.

A melting point of the fluorocarbon resin is preferably 250° C. or lower, and more preferably 200° C. or lower. If the melting point is excessively high, a compound or a formed body is foamed during kneading or extrusion in several cases. The melting point can be measured based on ASTM D3159.

A percentage content of the fluorocarbon resin is not particularly limited as long as the percentage content is within the range of the percentage content of any other resin or rubber as described above, and the percentage content is preferably 3 to 45% by mass, and more preferably 5 to 35% by mass, in 100% by mass of the base rubber. If the percentage content of the fluorocarbon resin is 3 to 45% by mass, strength can be significantly improved.

The oil component is not particularly limited, and specific examples thereof include organic oil or mineral oil Specific examples of the organic oil or the mineral oil include paraffin oil and naphthene oil.

A percentage content of the oil is not particularly limited, and when the base rubber contains the oil, the percentage content is preferably 0 to 20% by mass, and more preferably 0 to 10% by mass, in 100% by mass of the base rubber. If the content of the oil is excessively large, it can be a cause of bleeding and reduction of strength.

The present invention can be classified into two forms, namely, a form in which the base rubber contains no fluorocarbon resin, and a form in which the base rubber contains the fluorocarbon resin.

<Organic Peroxide>

The organic peroxide plays a role of generating a radical at least by thermal decomposition, to cause a grafting reaction due to the radical reaction of the silane coupling agent onto the base rubber component, as a catalyst. In particular, when the reaction site of the silane coupling agent contains, for example, an ethylenically unsaturated group, the organic peroxide play a role of causing the grafting reaction due to a radical reaction (including an abstraction reaction of a hydrogen radical from the base rubber component) between the ethylenically unsaturated group and the base rubber component.

The organic peroxide is not particularly limited, as long as the organic peroxide is one that generates a radical. For example, as the organic peroxide, the compound represented by the formula $R^1$—OO—$R^2$, $R^3$—OO—C(=O)$R^4$, or $R^5$C(=O)—OO(C=O)$R^6$ is preferable. Herein, $R^1$ to $R^6$ each independently represent an alkyl group, an aryl group, or an acyl group. Among $R^1$ to $R^6$ of each compound, it is preferable that all of $R^1$ to $R^6$ be an alkyl group, or any one of them be an alkyl group, and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexyne-3,1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butylcumyl peroxide and the like. Among them, dicumyl peroxide, 2,5-dimethyl-2,5-di-(tert-butyl peroxy)hexane, or 2,5-dimethyl-2,5-di-(tert-butyl peroxy)hexyne-3 is preferable, from the standpoint of odor, coloration, and scorch stability.

The decomposition temperature of the organic peroxide is preferably 80 to 195° C., and more preferably 125 to 180° C.

For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or heat generation starts, when the organic peroxide is heated from a room temperature in a heating rate of 5° C./min under a nitrogen gas atmosphere, by a thermal analysis such as a DSC method.

<Inorganic Filler>

In the present invention, the inorganic filler can be used without particular limitation, as long as the inorganic filler has, on a surface thereof, a site with which the inorganic filler can be chemically bonded to a reaction site, such as a silanol group or the like, of the silane coupling agent, by hydrogen bonding, covalent bonding or the like, or intermolecular bonding. For the inorganic filler, examples of the site that can be chemically bonded with the reaction site of the silane coupling agent may include an OH group (OH group of hydroxy group, of water molecule in hydrous substance or crystallized water, or of carboxyl group), amino group, a SH group, and the like.

As such an inorganic filler, though not limited to these, use can be made of metal hydrate, such as a compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, hydrotalcite, and talc. Further, use can be made of boron nitride, silica (crystalline silica, amorphous silica, and the like), carbon, clay (calcined clay), zinc oxide, tin oxide, titanium oxide, molybdenum oxide, antimony trioxide, a silicone compound, quartz, zinc borate, white carbon, zinc borate, zinc hydroxystannate, or zinc stannate.

As the inorganic filler, a surface-treated inorganic filler, surface-treated with a silane coupling agent or the like can be used. Specific examples of silane-coupling-agent-surface-treated inorganic filler include KISUMA 5L and KISUMA 5P (both trade names, magnesium hydroxide, manufactured by Kyowa Chemical Industry Co., Ltd.) or the like. The amount of surface treatment of the inorganic filler with a silane coupling agent is not particularly limited, but is 3 mass % or less, for example.

Among these inorganic fillers, silica, calcium carbonate, zinc oxide or calcined clay, or any combination of these is preferable.

The inorganic filler may be used singly alone, or in combination of two or more kinds thereof.

When the inorganic fillers is in a powder form, the inorganic filler has an average particle diameter of preferably 0.2 to 10 μm, more preferably 0.3 to 8 μm, further preferably 0.4 to 5 μm, and particularly preferably 0.4 to 3 μm. If the average particle diameter is within the above-described range, a silane coupling agent holding effect is high, to provide the product having excellent heat resistance. In addition, the inorganic filler is hard to cause secondary aggregation during mixing with the silane coupling agent, to provide the product having excellent outer appearance. The average particle diameter is obtained by dispersing the inorganic filler in alcohol or water, and then measuring using an optical particle diameter measuring device such as a laser diffraction/scattering particle diameter distribution measuring device.

<Silane Coupling Agent>

The silane coupling agent to be used in the present invention may be an agent at least having a grafting reaction site (a group or an atom) having a capability of being graft reacted onto the base rubber in the presence of a radical generated by decomposition of the organic peroxide, and a reaction site (including a moiety formed by hydrolysis: for example, a silyl ester group or the like) having both a capability of being silanol condensed, and a capability of reacting with the site having a capability of being chemically bonded in the inorganic filler. Specific examples of such a silane coupling agent include a silane coupling agent that has been used so far in the silane crosslinking method.

As such a silane coupling agent, for example, a compound represented by the following Formula (1) can be used.

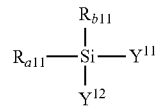

Formula (1)

In formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$ and $Y^{13}$ each represent a hydrolyzable organic group. $Y^{11}$, $Y^{12}$, and $Y^{13}$ may be the same or different from each other.

$R_{a11}$ is a grafting reaction site, and is preferably a group containing an ethylenically unsaturated group. Specific examples of the group containing the ethylenically unsaturated group include a vinyl group, a (meth)acryloyloxyalkylene group and a p-styryl group. Among them, a vinyl group is preferable.

$R_{b11}$ represents an aliphatic hydrocarbon group, a hydrogen atom, or $Y^{13}$ to be described below, and example of the aliphatic hydrocarbon group may include a monovalent aliphatic hydrocarbon group having 1 to 8 carbon atoms other than an aliphatic unsaturated hydrocarbon group. $R_{b11}$ preferably represents $Y^{13}$ to be described below.

$Y^{11}$, $Y^{12}$, and $Y^{13}$ each independently represent a reaction site capable of silanol condensation (a hydrolyzable organic group). Examples thereof may include an alkoxy group having 1 to 6 carbon atoms, an aryloxy group having 6 to 10 carbon atoms, and an acyloxy group having 1 to 4 carbon atoms, and an alkoxy group is preferable. Specific examples of the hydrolyzable organic group may include methoxy, ethoxy, butoxy, and acyloxy. Among them, from the standpoint of the reactivity of the silane coupling agent, methoxy or ethoxy is preferable.

As the silane coupling agent, a silane coupling agent that has high hydrolysis rate is preferable, a silane coupling agent in which $R_{b11}$ is $Y^{13}$ and also $Y^{11}$, $Y^{12}$, and $Y^{13}$ are the same each other, or a silane coupling agent in which at least one of $Y^{11}$, $Y^{12}$, and $Y^{13}$ is a methoxy group, is more preferable.

Specific examples of the silane coupling agent include vinylsilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, and vinyltriacetoxysilane, and (meth)acryloxysilanes such as methacryloxypropyltrimethoxysilane, methacryloxypropyltriethoxysilane, and methacryloxypropylmethyldimethoxysilane.

Among the silane coupling agents, the silane coupling agent having a vinyl group and an alkoxy group at an end is more preferable, and vinyltrimethoxysilane or vinyltriethoxysilane is particularly preferable.

The silane coupling agent may be used singly, or in combination of two or more kinds thereof. Further, the silane coupling agent may be used as it is, or may be diluted with a solvent and used.

<Silanol Condensation Catalyst>

The silanol condensation catalyst has an action of binding the silane coupling agents which have been grafted onto the base rubber to each other, by a condensation reaction, in the presence of water. Based on the action of the silanol condensation catalyst, the base rubber are crosslinked between themselves through silane coupling agent. As a result, the heat-resistant crosslinked fluorocarbon rubber formed body having excellent heat resistance can be obtained.

Examples of the silanol condensation catalyst to be used in the present invention include an organic tin compound, a metal soap, a platinum compound, and the like. Usual examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like. Among these, organic tin compounds such as dibutyltin dilaurate, dioctyltin dilaurate, dibutyltin dioctylate, and dibutyltin diacetate are particularly preferable.

In a step (b) as mentioned later, when the silanol condensation catalyst is simultaneously used with any other component than the silanol condensation catalyst, a material containing these components is referred to as a catalyst master batch.

<Carrier Rubber>

The silanol condensation catalyst may be mixed with the rubber, if desired, and used. In addition, the silanol condensation catalyst and the rubber can also be separately blended. In this case, rubber (also referred to as carrier rubber) to be mixed or blended is not particularly limited, and the base rubber component used in the silane master batch is preferable. When such materials are separately blended, the carrier rubber is preferably blended in mixing the silane master batch and the silanol condensation catalyst at the time of extrusion.

<Additive>

To the heat-resistant crosslinked fluorocarbon rubber formed body and the like, various additives which are usually used for electric wires, electric cables, electric cords, sheets, foams, tubes, and pipes, may be properly used in the range that does not adversely affect the effects exhibited by the present invention. Examples of these additives include a crosslinking assistant, an antioxidant, a lubricant, a metal inactivator, a filling agent (including a flame retardant and a flame retardant aid), and the like.

The crosslinking assistant refers to one that forms a partial crosslinking structure with the fluorocarbon rubber and the other resin or rubber, in the presence of the organic peroxide. Examples thereof may include polyfunctional compounds, for example, a (meth)acrylate compound such as polypropyleneglycol diacrylate and trimethylolpropane triacrylate, an allyl compound such as triallyl cyanurate; a maleimide compound, or a divinyl compound.

The antioxidant is not particularly limited, but, for example, an amine-based antioxidant, a phenol-based antioxidant, sulfur-based antioxidant, and the like can be used. Examples of the amine-based antioxidant include 4,4'-dioctyl-diphenylamine, N,N'-diphenyl-p-phenylenediamine, 2,2, 4-trirnethyl-1,2-dihydroquinoline polymer; and the like. Examples of the phenol-based antioxidant include pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and the like. Examples of the sulfur-based antioxidant include bis(2-methyl-4-(3-n-alkyl-thiopropionyloxy)-5-tert-butylphenyl)sulfide, 2-mercaptobenzimidazole and zinc salts thereof, and pentaerythritol-tetrakis(3-lauryl-thiopropionate). The antioxidant is preferably included in a content of 0.1 to 15.0 parts by mass, and more preferably included in a content of 0.1 to 10 parts by mass, with respect to 100 parts by mass of the base rubber.

Examples of the metal inactivator may include N,N'-bis (3-(3,5-di-tert-butyl-4-hydroxyphenyl)propionyl)hydrazine, 3-(N-salicyloyl)amino-1,2,4-triazole, and 2,2'-oxamidebis (ethyl-3-(3,5-di-tert-butyl-4-hydroxyphenyl)propionate).

Specific examples of the flame retardant (flame retardant aid) or the filling agent include carbon, clay, zinc oxide, tin oxide, titanium oxide, magnesium oxide, molybdenum oxide, antimony trioxide, a silicone compound, quartz, talc, calcium carbonate, magnesium carbonate, zinc borate and white carbon. These filling agents may be used as the filler, in mixing the silane coupling agent, or may be added to the carrier rubber.

Examples of the lubricant may include hydrocarbon-based, siloxane-based, fatty-acid-based, fatty-acid-amide-based, ester-based, alcohol-based, or metal-soap-based lubricants. These lubricants should be added to the carrier rubber.

Next, the production method of the present invention is specifically described.

In the method for producing the heat-resistant crosslinked fluorocarbon rubber formed body of the present invention, the following step (a) to step (c) are performed.

The silane master batch of the present invention is produced through the following step (a), and the master batch mixture of the present invention is produced through the following step (a) and step (b).

Step (a): a step of melt-kneading 0.003 to 0.5 part by mass of an organic peroxide, 0.5 to 400 parts by mass of an inorganic filler, and more than 2.0 parts by mass and 15.0 parts by mass or less of a silane coupling agent, with respect to 100 parts by mass of a base rubber containing a fluorocarbon rubber, at a temperature equal to or higher than a decomposition temperature of the organic peroxide, to prepare a silane master batch;

Step (b): a step of mixing the silane master batch obtained in the step (a) with a silanol condensation catalyst, and then forming the resultant mixture; and Step (c): a step of bringing the formed body obtained in the step (b) into contact with moisture, to cause silane crosslinking.

Here, a term "mixing" means obtaining of a uniform mixture.

In the step (a), a blending amount of the organic peroxide is 0.003 to 0.5 part by mass, preferably 0.005 to 0.5 part by mass, and more preferably 0.005 to 0.2 parts by mass, with respect to 100 parts by mass of the base rubber. If the blending amount of the organic peroxide is less than 0.003 part by mass, the grafting reaction does not progress, and unreacted silane coupling agents cause condensation with each other or unreacted silane coupling agent is volatilized, and sufficient heat resistance is unable to be obtained in several cases. On the other hand, if the blending amount thereof is over 0.5 part by mass, most of the rubber components are directly crosslinked by a side reaction, to form aggregated substances, to cause poor outer appearance in several cases. In addition, the silane master batch or the like that is excellent in extrudability is unable to be obtained in several cases. That is, the grafting reaction can be performed in a suitable range by adjusting the blending amount of the organic peroxide within this range. Thus, the silane master batch or the like that is excellent in extrudability without generating a gel-like aggregated substance (aggregate) can be obtained.

The blending amount of the inorganic filler is 0.5 to 400 parts by mass, and preferably 30 to 280 parts by mass, with respect to 100 parts by mass of the base rubber. If the blending amount of the inorganic filler is less than 0.5 part by mass, the grafting reaction of the silane coupling agent becomes nonuniform, and the heat-resistant crosslinked fluorocarbon rubber formed body is unable to be provided with excellent heat resistance in several cases. In addition, the grafting reaction of the silane coupling agent becomes nonuniform, and the outer appearance of the heat-resistant crosslinked fluorocarbon rubber formed body is deteriorated in several cases. On the other hand, if the blending amount is over 400 parts by mass, a load during forming or kneading is significantly increased, and secondary forming becomes difficult in several cases. In addition, the heat resistance or the outer appearance is deteriorated in several cases.

The blending amount of the silane coupling agent is more than 2.0 parts by mass and 15.0 parts by mass or less, with respect to 100 parts by mass of the base rubber. If the blending amount of the silane coupling agent is 2.0 parts by mass or less, the crosslinking reaction does not progress sufficiently, and the excellent heat resistance is not exhibited in several cases. In addition, in forming together with the silanol condensation catalyst, poor outer appearance or the aggregated substance is generated, and when an extruder is stopped, a large number of aggregated substances are generated, in several cases. On the other hand, if the blending amount is over 15.0 parts by mass, the silane coupling agent is unable to be farther adsorbed on the inorganic filler surfaces, and the silane coupling agent is volatilized during kneading, and such a case is not economical. In addition, the silane coupling agent that is not adsorbed causes condensation, and a crosslinked gel or aggregated substance or a burn is generated in the formed body, and the outer appearance is liable to be deteriorated.

From the above-described viewpoints, the blending amount of the silane coupling agent is preferably 3 to 12.0 parts by mass, and more preferably 4 to 12.0 parts by mass, with respect to 100 parts by mass of the base rubber.

The blending amount of the silanol condensation catalyst is not particularly limited, and is preferably 0.0001 to 0.5 part by mass, and more preferably 0.001 to 0.2 part by mass, with respect to 100 parts by mass of the base rubber. If the blending amount of the silanol condensation catalyst is within the above-mentioned range, the crosslinking reaction by the condensation reaction of the silane coupling agent easily progresses substantially uniformly, and the heat resistance, the outer appearance and physical properties of the heat-resistant crosslinked fluorocarbon rubber formed body are excellent, and productivity thereof is also improved. That is, if the blending amount of the silanol condensation catalyst is excessively small, the crosslinking by the condensation reaction of the silane coupling agent becomes hard to progress, and the heat resistance of the heat-resistant crosslinked fluorocarbon rubber formed body is hard to be improved and the productivity is reduced, or the crosslinking becomes nonuniform, in several cases. On the other hand, if the blending amount is excessively large, the silanol condensation reaction progresses significantly rapidly, and partial gelation is caused, and the outer appearance is deteriorated in several cases. In addition, the physical properties of the heat-resistant crosslinked fluorocarbon rubber formed body (rubber) are reduced in several cases.

In the present invention, an expression "melt-mixing the base rubber, the organic peroxide, the inorganic filler and the silane coupling agent" does not specify the mixing order in melt-mixing, and means that such materials may be mixed in any order. The mixing order in the step (a) is not particularly limited. In the present invention, the inorganic filler is preferably mixed with the silane coupling agent and used. That is, in the present invention, each component described above is preferably (melt-)mixed through the following steps (a-1) and (a-2).

Step (a-1): a step of mixing at least the inorganic filler and the silane coupling agent, to prepare a mixture.

Step (a-2): a step of melt-mixing the mixture obtained in the step (a-1) with all or part of the base rubber, in the presence of the organic peroxide, at a temperature equal to or higher than a decomposition temperature of the organic peroxide.

In the above-described step (a-2), the present invention includes "an aspect in which a total amount (100 parts by mass) of the base rubber is blended" and "an aspect in which part of the base rubber is blended". When part of the base rubber is blended in the step (a-2), a remainder of the base rubber is preferably blended in the step (b).

In the present invention, a term "part of the base rubber" means a resin used in the step (a-2) among the base rubbers, and means part of the base rubber itself (having the same composition with the base rubber), part of a resin component constituting the base rubber, and a resin component constituting the base rubber (for example, a total amount of a specific resin component among a plurality of resin components).

In addition, a term "a remainder of the base rubber" means a remaining base rubber except the part used in the step (a-2) in the base rubber, and specifically, means a remainder of the base rubber itself, a remainder of the base rubber component constituting the base rubber, and a remaining resin component constituting the base rubber.

When part of the base rubber is blended in the step (a-2), 100 parts by mass in the blending amount of the base rubber in the step (a) and the step (b) are a total amount of the base rubber to be mixed in the step (a-2) and the step (b).

Here, when the remainder of the base rubber is blended in the step (b), the base rubber is blended preferably in an amount of 80 to 99% by mass, and more preferably in an amount of 85 to 95% by mass in the step (a-2), and is blended preferably in an amount of 1 to 20% by mass, and more preferably in an amount of 5 to 15% by mass in the step (b).

In the present invention, as described above, the silane coupling agent is preferably pre-mixed or the like with the inorganic filler (step (a-1)).

The method of mixing the inorganic filler and the silane coupling agent is not particularly limited, and mixing methods such as wet treatment and dry treatment can be mentioned. Specific examples thereof include wet treatment in which a silane coupling agent is added in a solvent such as alcohol and water in a state in which an inorganic filler is dispersed, dry treatment in which the silane coupling agent is added and mixed, under heating or non-heating, to an untreated inorganic filler or to an inorganic filler preliminary subjected to surface treatment with stearic acid, oleic acid, phosphate or partially with the silane coupling agent, and both of these treatments. In the present invention, a dry treatment is preferable in which the silane coupling agent is added to the inorganic filler, preferably a dried inorganic filler, and mixed under heating or non-heating.

The pre-mixed silane coupling agent exists in such a manner of surrounding the surface of the inorganic filler, and a part or a whole thereof is adsorbed or bonded on the inorganic filler. In this manner, it becomes possible to suppress the volatilization of the silane coupling agent in the subsequent melt-mixing. Further, it is also possible to prevent the condensation among the silane coupling agents that are not adsorbed or bonded on the inorganic fillers, which makes melt-blending difficult. Furthermore, a desired shape can be obtained upon extrusion forming.

Specific examples of such a mixing method include a method in which an inorganic filler and a silane coupling agent are preferably mixed (dispersed) according to a dry method or a wet method at a temperature lower than a decomposition temperature of the organic peroxide, preferably at room temperature (25° C.), for about several minutes to several hours, and then this mixture and the base rubber are melt-mixed in the presence of the organic peroxide. This mixing is preferably performed by a mixer type kneading machine such as a Banbury mixer and a kneader. In this manner, an excessive crosslinking reaction between the base rubber components can be prevented, to provide the product having excellent outer appearance.

In this mixing method, the base rubber may exist as long as the above-described temperature lower than the decomposition temperature is kept. In this case, it is preferable to mix metal oxide and the silane coupling agent together with the base rubber at the above-described temperature (step (a-1)), and then melt-mix the resultant material.

A method of mixing the organic peroxide is not particularly limited, and the organic peroxide only needs to exist in melt-mixing the above-described mixture and the base rubber. The organic peroxide may be mixed, for example, simultaneously with the inorganic filler and the like, or may be mixed in any of stages of mixing the inorganic filer and the silane coupling agent, or may be mixed with a mixture of the inorganic filler and the silane coupling agent. For example, the organic peroxide may be mixed with the inorganic filler after the organic peroxide is mixed with the silane coupling agent, or may be mixed with the inorganic filler separately from the silane coupling agent. Only the silane coupling agent may be mixed with the inorganic filler, and then the organic peroxide may be mixed, depending on production conditions.

In addition, the organic peroxide may be a material mixed with any other component or a single body.

In the method of mixing the inorganic filler and the silane coupling agent, bonding force between the silane coupling agent and the inorganic filler is strong in wet mixing, and therefore volatilization of the silane coupling agent can be effectively suppressed, but the silanol condensation reaction becomes hard to progress in several cases. On the other hand, the silane coupling agent is easily volatilized in dry mixing, but the bonding force between the inorganic filler and the silane coupling agent is comparatively weak, and therefore the silanol condensation reaction becomes easy to progress efficiently.

In the production method of the present invention, the obtained mixture, all or part of the base rubber, and the remaining component(s) that is not mixed in the step (a-1) are subsequently melt-kneaded in the presence of the organic peroxide while the mixture is heated to the temperature equal to or higher than the decomposition temperature of the organic peroxide (step (a-2)).

In the step (a-2), the temperature at which the above-described component are melt-mixed (also referred to as melt-kneaded or kneaded) is equal to or higher than the decomposition temperature of the organic peroxide, preferably a temperature of the decomposition temperature of the organic peroxide plus (25 to 110)° C. This decomposition temperature is preferably set after the base rubber components are melted. If the above-described mixing temperature is applied, the above-described components are melted, and the organic peroxide is decomposed and acts thereon, and a required silane grafting reaction sufficiently progresses in the step (a-2). Other conditions, for example, a mixing time can be appropriately set.

A mixing method is not particularly limited, as long as the mixing method is a method ordinarily applied for rubber, plastic or the like. A mixing device may be appropriately selected depending on, for example, the blending amount of the inorganic filler. As a kneading device, a single-screw extruder, a twin-screw extruder, a roll, a Banbury mixer, or various kneaders may be used. From the standpoint of the dispersibility of the base rubber components and the stability of the crosslinking reaction, an enclosed mixer such as a Banbury mixer or various kneaders is preferable.

In addition, when the inorganic filler is blended exceeding 100 parts by mass with respect to 100 parts by mass of the base rubber, the kneading is preferably performed with an enclosed mixer such as a continuous kneader, a pressured kneader, or a Banbury mixer.

The method of mixing the base rubber containing the fluorocarbon rubber is not particularly limited. For example, the base rubber preliminarily mixed and prepared may be used, or each component, for example, each of the fluorocarbon rubber, any other resin or rubber component or the like, the oil component and a plasticizer may be separately mixed.

In the present invention, when each component described above is melt-mixed at one time, melt-mixing conditions are not particularly limited, and the conditions in the step (a-2) can be adopted.

In this case, part or all of the silane coupling agent is adsorbed or bonded to the inorganic filler during melt-mixing.

In the step (a), especially in the step (a-2), the above-mentioned each component is preferably kneaded without substantially mixing the silanol condensation catalyst. Thus, condensation reaction of the silane coupling agents can be suppressed, melt-mixing is easily conducted, and a desired shape can be obtained at the time of extrusion forming. Here, the term "without substantially mixing" does not meant to exclude the situation wherein the silanol condensation catalyst unavoidably exists, and means that the silanol condensation catalyst may exist at a degree at which the above-mentioned problem due to silanol condensation of the silane coupling agent is not caused. For example, in the step (a-2), the silanol condensation catalyst may exist when the content is 0.01 part by mass or less, with respect to 100 parts by mass of the base rubber.

In the step (a), the blending amount of any other resin or rubber that can be used in addition to the above-described component or the above-described additive is appropriately set within the range in which the object of the present invention is not adversely affected.

In the step (a), the above-described additive, particularly, the antioxidant or the metal inactivator may be mixed in any step or to any component, but may be mixed in the carrier rubber in view of not inhibiting the grafting reaction of the silane coupling agent mixed in the inorganic filler to the base rubber.

In the step (a), particularly in the step (a-2), it is preferable that the crosslinking assistant is not substantially mixed. If the crosslinking assistant is not substantially mixed, the crosslinking reaction between the base rubber components is hard to occur by the organic peroxide during melt-mixing, and the product having excellent outer appearance can be obtained. In addition, the grafting reaction of the silane coupling agent to the base rubber is hard to occur, and the product having excellent heat resistance can be obtained. Here, an expression "not substantially mixed" means that the crosslinking assistant may exist at a degree at which the above-described problem is not caused, and does not exclude the crosslinking assistance existing inevitably.

In the step (a), the fluorocarbon resin may be mixed in any step and to any component. The fluorocarbon resin should be mixed in the step (b) from viewpoints of suppressing decomposition of the organic peroxide and suppressing volatilization of the silane coupling agent as mentioned later.

When part of a base resin is blended in the step (a-2), the fluorocarbon resin may be blended as part of the base rubber used in the step (a-2) or as the remainder of the base rubber used in the step (b).

Thus, the silane master batch (also referred to as a silane MB) for use in producing the master batch mixture is prepared by performing the step (a). This silane MB contains a silane crosslinkable rubber in which the silane coupling agent is grafted to the base rubber at a degree at which the rubber can be formed in the step (b) described later.

In the production method of the present invention, the step (b) in which the silane MB obtained in the step (a) is mixed with the silanol condensation catalyst, and then the resultant mixture is formed, is subsequently performed.

In the step (b), when part of the base rubber is melt-mixed in the above-described step (a-2), the remainder of the base rubber and the silanol condensation catalyst are melt-mixed, to prepare the catalyst master batch (also referred to as a catalyst MB), and this catalyst master batch may be used. In addition, any other resin or rubber can also be used in addition to the remainder of the base rubber.

In the mixing in the step (b), the fluorocarbon resin is preferably blended as a component of the remainder of the base rubber as mentioned above. The remainder of the base resin in the step (b) in this case includes a form of containing the fluorocarbon rubber and the fluorocarbon resin, and a form of containing the fluorocarbon resin without containing the fluorocarbon rubber.

A mixing ratio of the above described remainder of the base rubber as the carrier rubber to the silanol condensation reaction catalyst is not particularly limited, but is preferably set so as to satisfy the above-described content in the step (a).

The mixing only needs to be performed by a method having a capability of uniformly performing mixing, and specific examples thereof include mixing (melt-mixing) performed under melting of the base rubber. The melt-mixing can be performed in a manner similar to the melt-mixing in the above-described step (a-2). For example, the mixing temperature is preferably from 80 to 250° C., and more preferably from 100 to 240° C. Other conditions such as a mixing time can be appropriately set.

The catalyst MB to be thus prepared is a mixture of the silanol condensation catalyst and the carrier rubber, and the filler to be added if desired.

On the other hand, when all of the base rubber is melt-mixed in the step (a-2), the silanol condensation catalyst itself, or a mixture of any other resin or rubber than the base rubber, and the silanol condensation catalyst is used. A method of mixing any other resin or rubber than the base rubber, and the silanol condensation catalyst is similar to the method for the above-described catalyst MB.

A blending amount of any other resin or rubber than the base rubber is preferably 1 to 60 parts by mass, more preferably 2 to 50 parts by mass, and further preferably 2 to 40 parts by mass, with respect to 100 parts by mass of the base rubber, in view of capability of promoting the grafting reaction in the step (a-2), and also difficulty in generating the aggregated substance during forming.

In the production method of the present invention, the silane MB and the silanol condensation catalyst (the silanol condensation catalyst itself, the catalyst MB prepared or the mixture of the silanol condensation catalyst and the other resin or rubber) are mixed.

As the mixing method, any mixing method may be employed as long as the uniform mixture can be obtained as mentioned above. For example, the mixing is basically similar to the melt-mixing in the step (a-2). There are resin components whose melting points cannot be measured by DSC or the like, elastomers for example, but kneading is performed at a temperature at which at least the base rubber melts. The melting temperature is appropriately selected according to the melting temperature of the base rubber or the carrier rubber, and it is preferably from 80 to 250° C., and more preferably from 100 to 240° C. Other conditions, for example, a mixing (kneading) time can be appropriately set.

In the step (b), in order to avoid the silanol condensation reaction, it is preferable that the silane MB and the silanol condensation catalyst are not kept in a high temperature state for a long period of time in the state of being mixed.

In the step (b), the silane MB and the silanol condensation catalyst only need to be mixed, and the silane MB and the catalyst master batch are preferably melt-mixed.

In the present invention, the silane MB and the silanol condensation catalyst can be dry-blended before both are melt-mixed. A method and conditions of dry blending are not particularly limited, and specific examples thereof include dry mixing and conditions in the step (a-1). The master batch mixture containing the silane MB and the silanol condensation catalyst is obtained by this dry blending.

In the step (b), the inorganic filler may be used. In this case, a blending amount of the inorganic filler is not particularly limited, and is preferably 350 parts by mass or less, with respect to 100 parts by mass of the carrier rubber. The reason is that, if the blending amount of the inorganic filler is excessively large, the silanol condensation catalyst is hard to disperse, and the crosslinking becomes hard to progress. On the other hand, if the blending amount of the inorganic filler is excessively small, a crosslinking degree of the formed body is reduced and sufficient heat resistance is not obtained in several cases.

In the present invention, the mixing in the step (a) and step (b) can be simultaneously or continuously performed.

In the step (b), the mixture thus obtained is formed (shaped). This forming step only needs to be capable of forming the mixture, and a forming method and forming conditions are appropriately selected according to a form of the heat-resistant product of the present invention. Specific examples of the forming method include extrusion forming using an extruder, extrusion forming using an injection forming machine, and forming using any other forming machine. The extrusion forming is preferable when the heat-resistant product of the present invention is the electric wire or the optical fiber cable.

In the step (b), the forming step can be performed simultaneously with the above-described mixing step or both steps can be continuously performed. That is, specific examples of one embodiment of the melt-mixing in the mixing step include an aspect of melt-mixing a forming raw material, in the melt-forming, for example, in the extrusion forming, or immediately before the extrusion forming.

For example, pellets may be blended with each other at ordinary temperature or a high temperature, such as dry blend, and then placed (melt-mixed) in a forming machine, or the pellets may be blended, and then melt-mixed, re-pelletized, and then placed in a forming machine. More specifically, a series of steps can be employed in which a mixture of the silane MB and the silanol condensation catalyst (forming-raw materials) is melt-kneaded in a coating device, and subsequently, extruded and coated on a periphery of a conductor or the like, and formed into a desired shape.

Thus, the formed body of the heat-resistant crosslinkable fluorocarbon rubber composition is obtained, in which the silane master batch and the silanol condensation catalyst are dry-blended, to prepare the master batch mixture, and the master batch mixture is introduced into the forming machine and formed.

Here, a melt mixture of the master batch mixture contains the silane crosslinkable rubber with different crosslinking methods. In this silane crosslinkable rubber, the reaction site of the silane coupling agent may be bonded or adsorbed to the inorganic filler, but is not subjected to silanol condensation as described later. Accordingly, the silane crosslinkable rubber contains at least crosslinkable rubber in which the silane coupling agent bonded or adsorbed to the inorganic filler is grafted to the base rubber (fluorine-containing rubber and a mixture thereof), and crosslinkable rubber in which the silane coupling agent not bonded or adsorbed to the inorganic filler is grafted to the base rubber. In addition, the silane crosslinkable rubber may have the silane coupling agent to which the inorganic filler is bonded or adsorbed, and the silane coupling agent to which the inorganic filler is not bonded or adsorbed. Further, the silane crosslinkable rubber may contain the base rubber component unreacted with the silane coupling agent.

When the silane crosslinkable rubber contains at least one kind selected from the group consisting of a resin of an ethylene-vinyl acetate copolymer, a resin of an ethylene-(meth)acrylate copolymer and a resin of an ethylene-(meth) acrylic acid copolymer, and an acrylic rubber, as the base rubber, the silane crosslinkable rubber is dynamically crosslinked. Here, an expression "dynamically crosslinked" means causing partial crosslinking of at least one kind of the resin or the rubber described above, in a state of melt-mixing of the master batch mixture, in the presence of the organic peroxide (during mixing or kneading), or a state of being crosslinked. Flowability is reduced by this dynamic crosslinking (for example, Mooney viscosity is increased, or a melt flow rate (MFR) is decreased). This dynamic crosslinking is formed during mixing in the step (a) and/or the step (b) described above.

As described above, the silane crosslinkable rubber is an uncrosslinked body in which the silane coupling agent is not subjected to silanol condensation.

Practically, if the melt-mixing is performed in the step (b), crosslinking of part (partial crosslinking) is inevitable, but at least formability during forming is to be kept on the heat-resistant crosslinkable fluorocarbon rubber composition to be obtained.

In the formed body to be obtained through the step (b), partial crosslinking is inevitable in a manner similar to the above-described mixture, but the formed body is in a partially crosslinked state of keeping formability at which the composition can be formed in the step (b). Accordingly, this heat-resistant crosslinked fluorocarbon rubber formed body of the present invention is obtained as a formed body crosslinked or finally crosslinked, by performing the step (c).

In the method for producing the heat-resistant crosslinked fluorocarbon rubber formed body of the present invention, the step (c) of bringing the formed body obtained in the step (b) into contact with water is performed. Thus, the reaction site of the silane coupling agent is hydrolyzed into silanol, and hydroxyl groups of the silanol are subjected to condensation by the silanol condensation catalyst existing in the formed body, and the crosslinking reaction occurs. Thus, the heat-resistant crosslinked fluorocarbon rubber formed body in which the silane coupling agent is subjected to silanol condensation and crosslinked can be obtained.

The treatment itself in this step (c) can be carried out according to an ordinary method. The condensation reaction between the silane coupling agents progresses just in storage at ordinary temperature. Accordingly, in the step (c), it is unnecessary to positively bring the formed body into contact with water. In order to accelerate this crosslinking reaction, the formed body can also be contacted positively with moisture. For example, the method of positively contacting the formed body with water can be employed, such as immersion into warm water, placement in a wet heat bath, and exposure to high temperature water vapor. In addition, pressure may be applied in order to penetrate moisture thereinto on the above occasion.

Thus, the method for producing the heat-resistant crosslinked fluorocarbon rubber formed body of the present invention is performed, and the heat-resistant crosslinked fluorocarbon rubber formed body is produced. This heat-resistant crosslinked fluorocarbon rubber formed body contains a crosslinked fluorocarbon rubber in which the (silane crosslinkable) rubber are subjected to condensation through silanol bonding (siloxane bonding). As one form of this silane crosslinked fluorocarbon rubber formed body, the formed body contains the silane crosslinked fluorocarbon rubber and the inorganic filler. Here, the inorganic filler may be bonded to the silane coupling agent of the silane crosslinked fluorocarbon rubber. Accordingly, the present invention includes an aspect in which the base rubber is crosslinked with the inorganic filler through the silanol bonding. Specifically, the silane crosslinked fluorocarbon rubber contains at least the crosslinked fluorocarbon rubber in which a plurality of crosslinked fluorocarbon rubber are bonded or adsorbed to the inorganic filler by the silane coupling agent and are bonded (crosslinked) through the inorganic filler and the silane coupling agent, and the crosslinked fluorocarbon rubber in which the reaction sites of the silane coupling agent on the above-described crosslinkable rubber are hydrolyzed and cause the silanol condensation reaction with each other, thereby being crosslinked through the silane coupling agent. In addition, in the silane crosslinked fluorocarbon rubber, bonding (crosslinking) through the inorganic filler and the silane coupling agent and crosslinking through the silane coupling agent may be mixed. Further, the silane crosslinked fluorocarbon rubber may contain the rubber component unreacted with the silane coupling agent and/or the uncrosslinked silane crosslinkable rubber. This crosslinked fluorocarbon rubber is further dynamically crosslinked in several cases, as mentioned above with regard to the silane crosslinkable rubber.

The production method of the present invention can be described as follows.

The method for producing the heat-resistant crosslinked fluorocarbon rubber formed body, having the following step (A), step (B) and step (C), in which the step (A) has the following step (A1) to step (A4).

Step (A): a step of mixing 0.003 to 0.5 part by mass of an organic peroxide, 0.5 to 400 parts by mass of an inorganic filler, and more than 2.0 parts by mass and 15.0 parts by mass or less of a silane coupling agent, with respect to 100 parts by mass of a base rubber containing a fluorocarbon rubber, and a silanol condensation catalyst, to obtain a mixture;

Step (B): a step of forming the mixture obtained in the step (A), to obtain a formed body; and Step (C): a step of bringing the formed body obtained in the step (B) into contact with water, to obtain a heat-resistant crosslinked fluorocarbon rubber formed body;

Step (A1): a step of mixing at least the inorganic filler and the silane coupling agent;

Step (A2): a step of melt-mixing the mixture obtained in the step (A1) and all or part of the base rubber, in the presence of the organic peroxide, at a temperature equal to or higher than a decomposition temperature of the organic peroxide;

Step (A3): a step of mixing the silanol condensation catalyst with, as a carrier rubber, a rubber different from the base rubber or a remainder of the base rubber; and Step (A4): a step of mixing the melt mixture obtained in the step (A2) with the mixture obtained in the step (A3).

In the above-described method, the step (A) corresponds to the above-described step (a) and a step to the mixing in the step (b), the step (B) corresponds to the forming step in the above-described step (b), and the step (C) corresponds to the above-described step (c). In addition, the step (A1), the step (A2), the step (A3) and step (A4) correspond to the above-described step (a-1), step (a-2), and the step to the mixing in the above-described step (b), respectively.

In the above-described method, the fluorocarbon resin is preferably mixed in any one of the steps (A2), (A3) and (A4) described above, preferably mixed in the step (A3) or (A4), and preferably mixed in at least the step (A4) described above.

Details of a reaction mechanism in the production method of the present invention are unknown yet, but it is considered as described below.

In general, if the organic peroxide is added to the base rubber, especially to the fluorocarbon rubber, a radical is rapidly generated to facilitate occurrence of the crosslinking reaction between the base rubbers or the decomposition reaction thereof. Thus, the aggregated substance is generated in the obtained heat-resistant crosslinked fluorocarbon rubber formed body and the physical properties thereof are reduced.

However, in the present invention, a large amount of the silane coupling agent is blended, and the silane coupling agent is further preliminarily bonded to the inorganic filler by the silanol bonding, the hydrogen bonding or the intermolecular bonding, in the step (a). In particular, in the preferred embodiment of the step (a), the treatment in which this bonding is formed, and the melt-mixing treatment are conducted, separately. Thus, it is considered that a chance of causing the grafting reaction between the grafting reaction site of the silane coupling agent and the base rubber, in particular, the fluorocarbon rubber is increased. It is considered that a reaction of boding this kept silane coupling agent to the radical generated in the base rubber becomes dominant over the crosslinking reaction between the base rubbers or the decomposition reaction as described above. Accordingly, the grafting reaction of the silane coupling agent to the base rubber (silane crosslinking) can be made, and deterioration by the decomposition reaction of the base rubber, particularly, of the fluorocarbon rubber, or the crosslinking reaction between the base rubbers during the reaction (the step (a)) is not caused. Therefore, it is considered that generation of the aggregated substance or reduction of the physical properties is hard to occur.

The reason why the heat-resistant crosslinked fluorocarbon rubber formed body exhibits high heat resistance is considered as described below.

When these components are kneaded (melt-mixed) in the step (a), the silane coupling agent bonded or adsorbed to the inorganic filler by weak bonding (interaction by the hydrogen bonding, interaction between ions, partial charges or dipoles, action by adsorption or the like) is detached from the inorganic filler, resulting in causing the grafting reaction with the base rubber. In the silane coupling agent thus graft-reacted, the reaction sites capable of silanol condensation are subjected to the condensation reaction (crosslinking reaction) to form the base rubber, especially fluorocarbon rubber, crosslinked through the silanol condensation. The heat resistance of the heat-resistant crosslinked fluorocarbon rubber formed body obtained through this crosslinking reaction is increased, and the heat-resistant crosslinked fluorocarbon rubber formed body which is not melted even at a high temperature can be obtained.

On the other hand, in the silane coupling agent bonded to the inorganic filler by strong bonding (chemical bonding with the hydroxyl group or the like on the surface of the inorganic filler, or the like), this condensation reaction by the silanol condensation catalyst in the presence of water is hard to occur, and bonding with the inorganic filler is kept. Therefore, bonding (crosslinking) of the base rubber with the inorganic filler through the silane coupling agent is formed. Thus, adhesion between the base rubber and the inorganic filler is consolidated, and the formed body that is excellent in mechanical strength and abrasion resistance and hard to be scratched is obtained. In particular, a plurality of silane coupling agents can be bonded to one inorganic filler particle surface, and high mechanical strength can be obtained.

It is estimated that the heat-resistant crosslinked fluorocarbon rubber formed body having high heat resistance can be obtained by forming these silane-grafted fluorocarbon rubber together with the silanol condensation catalyst, and then bringing the resultant material into contact with moisture.

In the present invention, the heat-resistant crosslinked fluorocarbon rubber formed body having high heat resistance can be obtained by mixing the organic peroxide in a ratio of 0.003 part by mass or more, preferably 0.005 part by mass or more, and 0.5 part by mass or less, preferably 0.2 part by mass or less, and further by mixing the silane coupling agent in a ratio of more than 2 parts by mass and 15 parts by mass or less, with respect to 100 parts by mass of the base rubber, in the presence of the inorganic filler.

In the present invention, if the fluorocarbon rubber is simultaneously used with the resin of the ethylene-vinyl acetate copolymer, the resin of the ethylene-(meth)acrylate copolymer, the resin of the ethylene-(meth)acrylic acid copolymer, or the acrylic rubber, or the any combination of these, extrusion formability of the forming material of the silane master batch, the master batch mixture or the like is improved, and the heat resistance of the heat-resistant crosslinked fluorocarbon rubber formed body is improved.

The reason why the extrusion formability of the forming material is improved is considered that viscosity of the rubber per se (particularly, viscosity at the time of high-speed forming) is reduced by blending these resins, thereby facilitating the high-speed forming, or achieving satisfactory outer appearance.

In addition, the reason why the heat resistance is improved is considered that the fluorocarbon rubber, the resin of the ethylene-vinyl acetate copolymer and the like are dynamically crosslinked to each other during melt-mixing (during progress of the silane grafting reaction) and/or during forming, to reinforce silane crosslinked structure. Specifically, for example, the resin of the ethylene-vinyl acetate copolymer and the fluorocarbon rubber are partially (dynamically) crosslinked (bonded) by the organic peroxide, and while keeping satisfactory formability, the partially (dynamically) crosslinked fluorocarbon rubber having reinforcement causing less crushing, or the abrasion resistance is obtained. Meanwhile, the silane coupling agent is graft-reacted to this partially crosslinked body by the organic peroxide. While this composition (forming material) is formed after being mixed with the carrier rubber containing the silanol condensation catalyst, this composition (forming material) is superior to a rubber single body in flowability during forming, and particularly in flowability during high-speed forming. Thus, the formed body having satisfactory outer appearance can be obtained. Furthermore, in the present invention, this formed body is crosslinked by being exposed to moisture after forming, and therefore non-melting is achieved, the heat resistance is improved, and simultaneously the reinforcement is further improved than in the partially crosslinked state. Thus, the heat-resistant crosslinked fluorocarbon rubber formed body satisfying both the reinforcement and the formability can be obtained.

On the other hand, the inorganic filler and the base resin are further crosslinked through the silane coupling agent, and therefore a significantly tough fluorocarbon rubber formed body having high strength and high reinforcement can be obtained without a crosslinking machine.

In the present invention, a ratio of the silane crosslinked structure to the dynamically crosslinked structure is not particularly limited, and is appropriately selected according to an application or the like. For example, this ratio can be set at a predetermined value depending on an amount of blending the silane coupling agent, an amount of blending the organic peroxide, a forming temperature or the like.

In the present invention, if the fluorocarbon resin is incorporated into the base rubber, the mechanical strength (for example, tensile strength and tensile elongation) and the abrasion resistance, in addition to the above-described characteristics, are improved. The reason is considered as described below.

If the fluorocarbon resin is incorporated into the base rubber, the fluorocarbon resin and the fluorocarbon rubber are compatibilized. In addition, the fluorocarbon resin has better flowability than a mixture of silane grafted fluorocarbon rubber has, and therefore stretching in forming is easily applied to promote a rise of strength, and simultaneously excellent outer appearance can be retained. Therefore, the resultant material can be processed into the heat-resistant crosslinked fluorocarbon rubber formed body that is excellent in mechanical strength, in addition to the above-mentioned characteristics. Adhesion between the formed bodies which is immediately after extrusion and crosslinking has not been advanced, can be reduced by further adding the fluorocarbon resin. It is difficult to mix the fluorocarbon rubber and the fluorocarbon resin in the chemical crosslinking method in which heat treatment is applied after forming, because the fluorocarbon rubber causes crosslinking before the fluorocarbon resin is melted. Accordingly, the present art is significantly useful for providing the fluorocarbon rubber forming material having high strength and the method for producing the same.

In addition, if the fluorocarbon resin is blended in the step (b), the above-described effect can be further efficiently obtained. If the fluorocarbon resin is incorporated into the base rubber of the silane MB, it is necessary to conduct the kneading at a high temperature, depending on the melting point of the fluorocarbon resin; and the organic peroxide in the silane MB is decomposed to inhibit the grafting reaction in several cases, or the silane coupling agent is volatilized in several cases. However, the above-described inhibition reaction can be suppressed, and volatilization of the silane coupling agent can be reduced by incorporating the fluorocarbon resin thereinto in the step (b). In this manner, the heat-resistant crosslinked fluorocarbon rubber formed body having excellent mechanical strength can be efficiently produced according to the effect caused by the above-described fluorocarbon resin.

The production method of the present invention is applicable to a production of a component part of or a member of a product (including a semi-finished product, a part and a member), such as a product requiring heat resistance, a product requiring strength, a product requiring flame retardancy, and a product using a rubber material. Accordingly, the heat-resistant product of the present invention is processed into such a product. At this time, the heat-resistant product may be a product containing the heat-resistant crosslinked fluorocarbon rubber formed body, or a product consisting of the heat-resistant crosslinked fluorocarbon rubber formed body.

Specific examples of such a heat-resistant product include an electric wire such as a heat-resistant flame-retardant insulated wire, a coating material for heat-resistant flame-retardant cable or optical fiber cable, a rubber substitute wire and cable material, other products including heat-resistant parts for a microwave oven or a gas range, heat-resistant flame-retardant wire parts, a flame-retardant heat-resistant sheet, and a flame-retardant heat-resistant film. In addition, the specific examples further include a power supply plug, a connector, a sleeve, a box, a tape-base material, a tube, a sheet, a packing, a cushion material, a seismic isolating material, a wiring material used in internal and external wiring for electric and electronic instruments, and particularly an electric wire or an optical fiber cable.

Among the above described products, the production method of the present invention is particularly preferably applied to production of electric wire and optical fiber cable, and it can form a coating material (an insulator, a sheath) thereof.

When the heat-resistant product of the present invention is an extrusion formed article such as the electric wire or the optical fiber cable, the product can be produced, preferably, while forming materials are melt-kneaded in the extruder (extrusion coating device) to prepare the heat-resistant crosslinkable fluorocarbon rubber composition, by extruding this heat-resistant crosslinkable fluorocarbon rubber composition on an outer periphery of a conductor or the like, to coat the conductor or the like. Such a heat-resistant product can be formed by extruding and coating the heat-resistant crosslinkable fluorocarbon rubber composition, even if a large amount of inorganic fillers is added thereto, on a circumference of a conductor or a circumference of a conductor longitudinally lapped or twisted with tensile strength fibers, by using a general-purpose extrusion coating device, without using a special machine such as an electron beam crosslinking machine. For example, as the conductor, a single wire, a stranded wire or the like of annealed copper can be used. Moreover, as the conductor, in addition to a bare wire, a tin-plated conductor or a conductor having an enamel-coating insulation layer can be used. A thickness of the insulation layer (coating layer formed of the heat resistant crosslinked fluorocarbon rubber formed body of the present invention) formed around the conductor is not particularly limited, but is generally about 0.15 to 10 mm.

EXAMPLES

The present invention will be described in more detail based on examples given below, but the invention is not meant to be limited by these.

In Tables 1 to 4, the numerical values for the content of the respective Examples and Comparative Examples are in terms of part by mass, unless otherwise specified.

Examples and Comparative Examples were carried out by using the following components, and setting respective specifications to conditions shown in Tables 1 to 4, and the results of evaluation as mentioned later are collectively shown in Tables 1 to 4.

Details of each compound listed in Tables 1 to 4 are described below.

A fluorine content of fluorocarbon rubber is expressed in terms of a value according to the above-described "potassium carbonate pyrohydrolysis method".

<Base Rubber>
(Fluorocarbon Rubber)
"AFLAS 150P" (trade name, manufactured by AGC Asahi Glass Co., Ltd., tetrafluoroethylene-propylene copolymer rubber, fluorine content: 57% by mass)
"AFLAS 150E" (trade name, manufactured by AGC Asahi Glass Co., Ltd., tetrafluoroethylene-propylene copolymer rubber, fluorine content: 57% by mass)
"DAI-EL G801" (trade name, manufactured by Daikin Industries, Ltd., vinylidene fluoride-hexafluoropropylene copolymer rubber, fluorine content: 66% by mass)
"Viton GBL200" (trade name, manufactured by DuPont Elastomers Co., Ltd., fluorine content: 66%)
"Viton GBL900" (trade name, manufactured by DuPont Elastomers Co., Ltd., fluorine content: 66%)
"Viton A500" (trade name, manufactured by DuPont Elastomers Co., Ltd., vinylidene fluoride-hexafluoropropylene copolymer rubber, fluorine content: 66% by mass)
(Other Components)
"VF120T" (trade name, manufactured by Ube Industries, Ltd., resin of ethylene-vinyl acetate copolymer, VA content: 20% by mass)
"Evaflex EV360" (trade name, manufactured by Du Pont-Mitsui Polychemicals Co., Ltd., resin of ethylene-vinyl acetate copolymer, VA content: 25% by mass)
"NUC 6510" (trade name, manufactured by Nippon Unicar Co., Ltd., ethylene-ethyl acrylate resin, EA content: 23% by mass, density: 0.93 g/cm$^3$)
"Evaflex EV180" (trade name, manufactured by Du Pont-Mitsui Polychemicals Co., Ltd., resin of ethylene-vinyl acetate copolymer, VA content: 33% by mass)
"Vamac DP" (trade name, manufactured by Mitsui-Du Pont Chemicals Co., acrylic rubber)

"RP-4020" (trade name, manufactured by Daikin Industries, Ltd., resin of ethylene-tetrafluoroethylene-hexafluoropropylene (ethylene-FEP) copolymer, melting point: 160° C.)
"LH-8000" (trade name, manufactured by Asahi Glass Co., Ltd., resin of ethylene-tetrafluoroethylene (ETFE) copolymer, melting point: 180° C.)
"EP521" (trade name, manufactured by Daikin Industries, Ltd., resin of ethylene-tetrafluoroethylene (ETFE) copolymer, melting point: 260° C.)
"EP610" (trade name, manufactured by Daikin Industries, Ltd., resin of ethylene-tetrafluoroethylene (ETFE) copolymer, melting point: 180° C.)
"KAYNER740" (trade name, manufactured by Arkema S.A., polyvinylidene fluoride (PVDF) resin, melting point: 170° C.)
<Organic Peroxide>
"PERHEXA 25B" (trade name, manufactured by NOF CORPORATION., 2,5-dimethyl-2,5-di(tert-butylperoxy) hexane, decomposition temperature 149° C.)
<Inorganic Filler>
"Zinc Oxide No. 1" (trade name, manufactured by Mitsui Mining & Smelting Co., Ltd., zinc oxide)
"SOFTON 1200" (trade name, manufactured by BIHOKU FUNKA KOGYO CO., LTD., calcium carbonate)
"Aerosil 200" (trade name, manufactured by Nippon Aerosil Co., Ltd., hydrophilic fumed silica, amorphous silica)
"CRYSTALITE 5X" (trade name, manufactured by Tatsumori Ltd., crystalline silica)
"Satitone SP-33" (trade name, manufactured by Engelhard Corporation, calcined clay)
"MV Talc" (trade name, manufactured by Nihon Mistron Co., Ltd., talc)
<Silane Coupling Agent>
"KBM-1003" (trade name, manufactured by Shin-Etsu Chemical Co., Ltd., vinyltrimethoxysilane)
"KBE-1003" (trade name, manufactured by Shin-Etsu Chemical Co., Ltd., vinyltriethoxysilane)
<Silanol Condensation Catalyst>
"ADKSTAB OT-1" (trade name, manufactured by ADEKA CORPORATION, dioctyltin dilaurate)
<Antioxidizing Agent>
"IRGANOX 1010" (trade name, manufactured by BASF, pentaerythritol tetrakis [3-(3,5-di-tert-butyl-4-hydroxyphenyl)propionate])

Examples 1 to 27 and Comparative Examples 1 to 6

In Examples 1 to 18 and 20 to 27 and Comparative Examples 1 to 6, part of base rubber was used as carrier rubber of a catalyst MB.

First, an inorganic filler and a silane coupling agent, in mass ratios listed in Tables 1 to 4, were placed in a 10L Henschel mixer manufactured by Toyo Seiki Seisaku-sho, Ltd. and the resultant mixture was mixed at room temperature (25° C.) for 1 hour to obtain a powder mixture. Next, the power mixture thus obtained, and each component listed in the base rubber column and the organic peroxide in Tables 1 to 4, in mass ratios listed in Tables 1 to 4, were placed in a 2 L Banbury mixer manufactured by Nippon Roll MFG. Co., Ltd., and the resultant mixture was kneaded at a temperature equal to or higher than a decomposition temperature of the organic peroxide, specifically, at 190° C., for 10 minutes, and then discharged at a material discharge temperature of 200° C., to obtain a silane MB. The silane MB obtained contains a silane crosslinkable rubber in which the silane coupling agent is graft-reacted onto the base rubber.

Meanwhile, in Examples 1 to 27 and Comparative Examples 1 to 6, a catalyst MB was arranged as described below.

In Examples 1 to 12, 22 and 24 to 27 and Comparative Examples 1 to 6, carrier rubber, a silanol condensation catalyst and an antioxidant were melt-mixed by a Banbury mixer at 180 to 190° C., in mass ratios listed in Tables 1 to 4, and the resultant mixture was discharged at a material discharge temperature of 180 to 190° C., to obtain the catalyst MB. This catalyst MB is a mixture of the carrier rubber and the silanol condensation catalyst.

In Example 19, a silanol condensation catalyst and an antioxidant were arranged.

In Examples 13, 14 and 23, a catalyst MB was obtained as described below. Crumb-shaped fluorocarbon rubber was pulverized into a flake shape. Subsequently, the fluorocarbon rubber obtained, a fluorocarbon resin, an antioxidant and a silanol condensation catalyst were dry-blended, the resultant mixture was introduced into a twin screw extruder, and melt-mixed at a head temperature of 230 to 270° C., and then extruded into a strand form. The strand obtained was cut to obtain a pellet-form catalyst MB.

In Examples 15 to 18, 20 and 21, a pellet-form catalyst MB was obtained in the same manner as in Example 13 except that no fluorocarbon rubber was used.

Subsequently, a silane MB and a catalyst MB, and further a fluorocarbon resin in Examples 19 and 27 were placed in an enclosed ribbon blender, and the resultant mixture was dry-blended at room temperature (25° C.) for 5 minutes, to obtain a dry-blended product (master batch mixture). At this time, a mixing ratio of the silane MB and the catalyst MB, and further the fluorocarbon resin in Examples 19 and 27 was expressed in terms of a mass ratio listed in Tables 1 to 4.

Subsequently, the obtained dry-blended product was introduced into an extruder equipped with a screw having a screw diameter of 30 mm with L/D=24 (ratio of screw effective length L to diameter D) (compression zone screw temperature: 170° C., head temperature: 200° C.; except that compression zone screw temperature: 190° C., head temperature: 220° C. for Example 19). While the dry-blended product was melt-mixed in this extruder, the melted mixture was coated on an outside of a 1/0.8 TA conductor at a thickness of 1 mm, to obtain a coated conductor having an outer diameter of 2.8 mm. This coated conductor was left to stand for one week under an atmosphere of a temperature of 40° C. and a relative humidity of 95%.

Thus, an electric wire having a coating layer formed of the heat-resistant crosslinked fluorocarbon rubber formed body on an outer periphery of the above-described conductor was produced. The heat-resistant crosslinked fluorocarbon rubber formed body as the coating layer has the above-mentioned silane crosslinked fluorocarbon rubber.

In Comparative Example 1, a large number of aggregated substances were generated and extrusion forming was unable to be performed.

A heat-resistant crosslinkable fluorocarbon rubber composition was prepared by melt-mixing the above-described dry-blended product in the extruder before extrusion forming. This heat-resistant crosslinkable fluorocarbon rubber composition is a melt mixture of the silane MB and the catalyst MB, and contains the above-mentioned silane crosslinkable rubber.

The following tests were conducted on each electric wire produced, and the results are shown in Tables 1 to 4.

<Heat Deformation Test>

A heat deformation test was conducted on each electric wire produced at a measuring temperature of 150° C. and a load of 5 N based on UL1581. In this test, with regard to heat deformation, a case where a deformation ratio was 50% or less was deemed as pass.

<Hot Set Test>

A hot set test was conducted by using a tubular piece prepared by extracting a conductor from each electric wire produced. In the hot set test, marker lines having a length of 50 mm were attached on the tubular piece, and then the tubular piece to which a weight of 117 g was attached was left to stand in a constant temperature chamber at a temperature of 200° C. for 15 minutes, and elongation was determined by measuring a length after being left to stand. In addition, a case where the elongation is 100% or less was deemed as pass in this test, and was expressed as "A". A case where the elongation was over 100% was expressed as "C".

<Winding Heating Test>

Each electric wire (sample) produced was wound by 6 turns with a self-diameter, and the resultant material was left to stand in a constant temperature chamber at 236° C. for 4 hours. After being left to stand, the sample was removed, and loosened into a linear shape.

A case where the sample was thoroughly loosened is deemed as "A", a case where the sample was loosened in a state of the coating layer attached (keeping the electric wire form), although a surface of the coating layer was melted, is deemed as "B", and a case where the coating layer was significantly melted and broken and the conductor is exposed is deemed as "C".

In this test, the "B" evaluation or better is a pass level.

<Adhesion of Electric Wire After Electric Wire Production>

The coated conductor obtained as described above was wound around a bobbin by 200 m (four stack) after being produced, and then left to stand at 30° C. for 48 hours and brought into contact with water, and adhesion between the electric wires obtained was confirmed.

A case where no electric wires were adhered with each other at all when the electric wires were pulled out from the bobbins is deemed as "A", a case where the electric wires were adhered with each other a little is deemed as "B", and a case where the electric wires were adhered with each other to cause a scratch is deemed as "C".

The "B" evaluation or better is a pass level.

<Extrusion Outer Appearance Test>

As an extrusion outer appearance test, outer appearance of a coated conductor was observed and evaluated in producing the coated conductor.

A product which was able to be formed into an electric wire form without the aggregated substance on the outer appearance of the coated conductor was expressed as "A", a product which was able to be formed into an electric wire form, although generation of the aggregated substance was able to be confirmed even at a degree of having no problem on the outer appearance, was expressed as "B", and a product which was unable to be formed into an electric wire form by significant generation of poor outer appearance was expressed as "C". The extrusion outer appearance test is a reference test, and "B" evaluation or better is deemed as a pass level in this test.

Further, among the electric wires produced, the following tests were conducted on the electric wires in Examples 1, 2, 12 to 23, and 27, and the results are shown in Tables 1 to 4.

<Tensile Test>

Tensile strength (MPa) and tensile elongation (%) were measured by using a tubular piece prepared by extracting a conductor from each electric wire, under conditions of a gauge length of 20 mm and a tensile speed of 200 mm/min, based on JIS C 3005.

The tensile strength is preferably 8 MPa or more, and more preferably 8.5 MPa or more.

The tensile elongation is preferably 100% or more, and more preferably 150% or more.

<Heat Aging Test>

The tubular piece used in the above-mentioned tensile test was kept at a heating temperature of 236° C. for 168 hours. Tensile strength (MPa) after being kept and tensile elongation (%) after being kept were measured by using the tubular piece after being kept, under conditions of a gauge length of 20 mm and a tensile speed of 200 mm/min, based on JIS C 3005.

A retention rate (%) of tensile strength was calculated by dividing the tensile strength after being kept by the tensile strength before being kept (tensile strength obtained by the above-mentioned tensile test). A retention rate (%) of tensile elongation was calculated in a similar manner.

It is preferable that the retention rate of tensile strength is 70% or more and the retention rate of tensile elongation is 60% or more, and it is more preferable that the retention rate of tensile strength is 70% or more and the retention rate of tensile elongation is 70% or more.

TABLE 1

|  |  |  |  | This invention | | | | |
|---|---|---|---|---|---|---|---|---|
|  |  |  |  | 1 | 2 | 3 | 4 | 5 |
| Silane MB | Base rubber | Fluorocarbon rubber | AFLAS 150P | 90 | 70 | 75 | 50 | 70 |
|  |  | Fluorocarbon rubber | AFLAS 150E |  |  |  |  |  |
|  |  | Fluorocarbon rubber | DAI-EL G801 |  |  |  |  |  |
|  |  | Fluorocarbon rubber | Viton GBL200 |  |  |  |  |  |
|  |  | Fluorocarbon rubber | Viton GBL900 |  |  |  |  |  |
|  |  | Fluorocarbon rubber | Viton A500 |  |  |  |  |  |
|  |  | EVA | VF120T |  |  |  |  |  |
|  |  | EVA | Evaflex EV360 |  | 20 |  |  |  |
|  |  | EEA | NUC6510 |  |  | 15 |  |  |
|  |  | EVA | Evaflex EV180 |  |  |  | 40 |  |
|  |  | Acrylic rubber | Vamac DP |  |  |  |  | 20 |
|  |  | Et-FEP copolymer | RP4020 (mp 160° C.) |  |  |  |  |  |
|  | Organic peroxide |  | PERHEXA 25B | 0.2 | 0.1 | 0.1 | 0.05 | 0.1 |
|  | Inorganic filler | Zinc oxide | Zinc Oxide No. 1 | 10 | 10 |  | 10 | 10 |
|  |  | Calcium carbonate | SOFTON 1200 | 50 | 100 |  | 30 | 30 |
|  |  | Silica | Aerosil 200 |  |  | 1 | 4 | 1 |
|  |  | Silica | CRYSTALITE 5X |  |  |  |  |  |
|  |  | Calcined clay | Satitone SP-33 |  |  |  |  |  |
|  |  | Talc | MVTalc |  |  |  |  |  |
|  | Silane coupling agent | Vinyltrimethoxysilane | KBM-1003 | 5 | 12 | 2.5 | 12 | 8 |
|  |  | Vinyltriethoxysilane | KBE-1003 |  |  |  |  |  |
| Catalyst MB | Carrier rubber | Fluorocarbon rubber | AFLAS 150P | 10 | 10 | 10 | 10 | 10 |
|  |  | Fluorocarbon rubber | DAI-EL G801 |  |  |  |  |  |
|  |  | Fluorocarbon rubber | Viton GBL200 |  |  |  |  |  |
|  |  | Fluorocarbon rubber | Viton A500 |  |  |  |  |  |
|  |  | Et-FEP copolymer | RP4020 (mp 160° C.) |  |  |  |  |  |
|  |  | ETFE resin | LH-8000 (mp 180° C.) |  |  |  |  |  |
|  |  | ETFE resin | EP610 (mp 180° C.) |  |  |  |  |  |
|  |  | PVDF resin | KAYNER740 (mp 170° C.) |  |  |  |  |  |
|  | Silanol condensation catalyst | Dioctyltin dilaurate | ADKSTAB OT-1 | 0.05 | 0.05 | 0.05 | 0.05 | 0.05 |
|  | Antioxidizing agent |  | IRGANOX 1010 | 0.1 | 0.1 | 0.1 | 0.1 | 0.1 |
|  | Mixed at extrusion | ETFE resin | EP521 (mp 260° C.) |  |  |  |  |  |
|  |  | Et-FEP copolymer | RP4020 (160° C.) |  |  |  |  |  |
| Evaluation |  |  | Heat deformation test (%) | 32 | 28 | 45 | 18 | 32 |
|  |  |  | Hot set test | A | A | A | A | A |
|  |  |  | Winding heating test | A | A | B | A | A |
|  |  |  | Adhesion of electric wire after electric wire production | B | B | B | B | B |
|  |  |  | Extrusion outer appearance | A | A | A | A | A |
|  |  |  | Tensile strength (MPa) | 4.1 | 5.2 |  |  |  |
|  |  |  | Tensile elongation (%) | 380 | 240 |  |  |  |
|  |  | Heat aging test | Tensile strength retention rate (%) | 118 | 125 |  |  |  |
|  |  | (236° C. × 168 hr) | Tensile elongation retention rate (%) | 88 | 80 |  |  |  |

|  |  |  |  | This invention | | | |
|---|---|---|---|---|---|---|---|
|  |  |  |  | 6 | 7 | 8 | 9 |
| Silane MB | Base rubber | Fluorocarbon rubber | AFLAS 150P |  |  |  |  |
|  |  | Fluorocarbon rubber | AFLAS 150E | 90 |  |  |  |
|  |  | Fluorocarbon rubber | DAI-EL G801 |  | 70 |  |  |
|  |  | Fluorocarbon rubber | Viton GBL200 |  |  | 70 |  |
|  |  | Fluorocarbon rubber | Viton GBL900 |  |  |  | 90 |
|  |  | Fluorocarbon rubber | Viton A500 |  |  |  |  |

TABLE 1-continued

| | | | | | | | | |
|---|---|---|---|---|---|---|---|---|
| | | EVA | VF120T | | | | | |
| | | EVA | Evaflex EV360 | | | 20 | 20 | |
| | | EEA | NUC6510 | | | | | |
| | | EVA | Evaflex EV180 | | | | | |
| | | Acrylic rubber | Vamac DP | | | | | |
| | | Et-FEP copolymer | RP4020 (mp 160° C.) | | | | | |
| | Organic peroxide | | PERHEXA 25B | 0.4 | 0.1 | 0.1 | 0.25 | |
| | Inorganic filler | Zinc oxide | Zinc Oxide No. 1 | 50 | | 40 | | |
| | | Calcium carbonate | SOFTON 1200 | 50 | | 50 | | |
| | | Silica | Aerosil 200 | | 1 | | | |
| | | Silica | CRYSTALITE 5X | | | | | |
| | | Calcined clay | Satitone SP-33 | | 30 | | | |
| | | Talc | MVTalc | | | | 50 | |
| | Silane coupling agent | Vinyltrimethoxysilane | KBM-1003 | | 5 | 5 | 5 | |
| | | Vinyltriethoxysilane | KBE-1003 | 15 | | | | |
| Catalyst MB | Carrier rubber | Fluorocarbon rubber | AFLAS 150P | 10 | | | | |
| | | Fluorocarbon rubber | DAI-EL G801 | | 10 | | 10 | |
| | | Fluorocarbon rubber | Viton GBL200 | | | 10 | | |
| | | Fluorocarbon rubber | Viton A500 | | | | | |
| | | Et-FEP copolymer | RP4020 (mp 160° C.) | | | | | |
| | | ETFE resin | LH-8000 (mp 180° C.) | | | | | |
| | | ETFE resin | EP610 (mp 180° C.) | | | | | |
| | | PVDF resin | KAYNER740 (mp 170° C.) | | | | | |
| | Silanol condensation catalyst | Dioctyltin dilaurate | ADKSTAB OT-1 | 0.05 | 0.05 | 0.05 | 0.05 | |
| | Antioxidizing agent | | IRGANOX 1010 | 0.1 | 0.1 | 0.1 | 0.1 | |
| | Mixed at extrusion | ETFE resin | EP521 (mp 260° C.) | | | | | |
| | | Et-FEP copolymer | RP4020 (160° C.) | | | | | |
| Evaluation | | | Heat deformation test (%) | 25 | 35 | 36 | 33 | |
| | | | Hot set test | A | A | A | A | |
| | | | Winding heating test | A | A | A | A | |
| | | | Adhesion of electric wire after electric wire production | B | B | B | B | |
| | | | Extrusion outer appearance | B | A | B | A | |
| | | | Tensile strength (MPa) | | | | | |
| | | | Tensile elongation (%) | | | | | |
| | Heat aging test (236° C. × 168 hr) | | Tensile strength retention rate (%) | | | | | |
| | | | Tensile elongation retention rate (%) | | | | | |

Note:
"Et-FEP copolymer" stands for Ethylene-FEP copolymer.

TABLE 2

| | | | | This invention | | | | | |
|---|---|---|---|---|---|---|---|---|---|
| | | | | 10 | 11 | 12 | 24 | 25 | 26 |
| Silane MB | Base rubber | Fluorocarbon rubber | AFLAS 150P | | | 70 | | | |
| | | Fluorocarbon rubber | AFLAS 150E | | 50 | | | | 60 |
| | | Fluorocarbon rubber | DAI-EL G801 | | | | | | |
| | | Fluorocarbon rubber | Viton GBL200 | | | | | | |
| | | Fluorocarbon rubber | Viton GBL900 | | | | | | |
| | | Fluorocarbon rubber | Viton A500 | 90 | | | 50 | 70 | |
| | | EVA | VF120T | | | 20 | | | |
| | | EVA | Evaflex EV360 | | | | | 20 | |
| | | EEA | NUC6510 | | | | 40 | | |
| | | EVA | Evaflex EV180 | | 40 | | | | 40 |
| | | Acrylic rubber | Vamac DP | | | | | | |
| | | Et-FEP copolymer | RP4020 (mp 160° C.) | | | | | | |
| | Organic peroxide | | PERHEXA 25B | 0.2 | 0.05 | 0.1 | 0.15 | 0.15 | 0.2 |
| | Inorganic filler | Zinc oxide | Zinc Oxide No. 1 | 10 | 150 | 10 | 10 | 10 | 150 |
| | | Calcium carbonate | SOFTON 1200 | 50 | 150 | | 50 | 50 | 150 |
| | | Silica | Aerosil 200 | | | | | | |
| | | Silica | CRYSTALITE 5X | | | 60 | | | |
| | | Calcined clay | Satitone SP-33 | | | | | | |
| | | Talc | MVTalc | | | | | | |
| | Silane coupling agent | Vinyltrimethoxysilane | KBM-1003 | 5 | 7 | 12 | 5 | 5 | 7 |
| | | Vinyltriethoxysilane | KBE-1003 | | | | | | |
| Catalyst MB | Carrier rubber | Fluorocarbon rubber | AFLAS 150P | | 10 | 10 | | | 10 |
| | | Fluorocarbon rubber | DAI-EL G801 | | | | | | |
| | | Fluorocarbon rubber | Viton GBL200 | | | | | | |
| | | Fluorocarbon rubber | Viton A500 | 10 | | | 10 | 10 | |

TABLE 2-continued

|  |  |  |  |  |  |  |  |  |  |
|---|---|---|---|---|---|---|---|---|---|
|  |  | Et-FEP copolymer | RP4020 (mp 160° C.) |  |  |  |  |  |  |
|  |  | ETFE resin | LH-8000 (mp 180° C.) |  |  |  |  |  |  |
|  |  | ETFE resin | EP610 (mp 180° C.) |  |  |  |  |  |  |
|  |  | PVDF resin | KAYNER740 (mp 170° C.) |  |  |  |  |  |  |
|  | Silanol condensation catalyst | Dioctyltin dilaurate | ADKSTAB OT-1 | 0.05 | 0.05 | 0.05 | 0.05 | 0.05 | 0.05 |
|  | Antioxidizing agent |  | IRGANOX 1010 | 0.1 | 0.1 | 0.1 | 0.1 | 0.1 | 0.1 |
|  | Mixed at extrusion | ETFE resin | EP521 (mp 260° C.) |  |  |  |  |  |  |
|  |  | Et-FEP copolymer | RP4020 (160° C.) |  |  |  |  |  |  |
| Evaluation |  | Heat deformation test (%) |  | 32 | 22 | 28 | 28 | 26 | 29 |
|  |  | Hot set test |  | A | A | A | A | A | A |
|  |  | Winding heating test |  | A | A | A | A | A | A |
|  |  | Adhesion of electric wire after electric wire production |  | B | B | B | B | B | B |
|  |  | Extrusion outer appearance |  | B | A | A | A | A | A |
|  |  | Tensile strength (MPa) |  |  |  |  | 6.2 |  |  |
|  |  | Tensile elongation (%) |  |  |  |  | 250 |  |  |
|  | Heat aging test | Tensile strength retention rate (%) |  |  |  |  | 122 |  |  |
|  | (236° C. × 168 hr) | Tensile elongation retention rate (%) |  |  |  |  | 82 |  |  |

|  |  |  |  | Comparative example | | |
|---|---|---|---|---|---|---|
|  |  |  |  | 1 | 2 | 3 |
| Silane MB | Base rubber | Fluorocarbon rubber | AFLAS 150P | 90 |  |  |
|  |  | Fluorocarbon rubber | AFLAS 150E |  | 90 | 90 |
|  |  | Fluorocarbon rubber | DAI-EL G801 |  |  |  |
|  |  | Fluorocarbon rubber | Viton GBL200 |  |  |  |
|  |  | Fluorocarbon rubber | Viton GBL900 |  |  |  |
|  |  | Fluorocarbon rubber | Viton A500 |  |  |  |
|  |  | EVA | VF120T |  |  |  |
|  |  | EVA | Evaflex EV360 |  |  |  |
|  |  | EEA | NUC6510 |  |  |  |
|  |  | EVA | Evaflex EV180 |  |  |  |
|  |  | Acrylic rubber | Vamac DP |  |  |  |
|  |  | Et-FEP copolymer | RP4020 (mp 160° C.) |  |  |  |
|  | Organic peroxide |  | PERHEXA 25B | 0.6 | 0.001 | 0.05 |
|  | Inorganic filler | Zinc oxide | Zinc Oxide No. 1 | 10 | 10 | 0.2 |
|  |  | Calcium carbonate | SOFTON 1200 | 50 | 60 |  |
|  |  | Silica | Aerosil 200 |  |  |  |
|  |  | Silica | CRYSTALITE 5X |  |  |  |
|  |  | Calcined clay | Satitone SP-33 |  |  |  |
|  |  | Talc | MVTalc |  |  |  |
|  | Silane coupling agent | Vinyltrimethoxysilane | KBM-1003 | 5 | 5 | 5 |
|  |  | Vinyltriethoxysilane | KBE-1003 |  |  |  |
| Catalyst MB | Carrier rubber | Fluorocarbon rubber | AFLAS 150P | 10 | 10 | 10 |
|  |  | Fluorocarbon rubber | DAI-EL G801 |  |  |  |
|  |  | Fluorocarbon rubber | Viton GBL200 |  |  |  |
|  |  | Fluorocarbon rubber | Viton A500 |  |  |  |
|  |  | Et-FEP copolymer | RP4020 (mp 160° C.) |  |  |  |
|  |  | ETFE resin | LH-8000 (mp 180° C.) |  |  |  |
|  |  | ETFE resin | EP610 (mp 180° C.) |  |  |  |
|  |  | PVDF resin | KAYNER740 (mp 170° C.) |  |  |  |
|  | Silanol condensation catalyst | Dioctyltin dilaurate | ADKSTAB OT-1 | 0.05 | 0.05 | 0.05 |
|  | Antioxidizing agent |  | IRGANOX 1010 | 0.1 | 0.1 | 0.1 |
|  | Mixed at extrusion | ETFE resin | EP521 (mp 260° C.) |  |  |  |
|  |  | Et-FEP copolymer | RP4020 (160° C.) |  |  |  |
| Evaluation |  | Heat deformation test (%) |  | Could not formed | 84 | 78 |
|  |  | Hot set test |  |  | C | C |
|  |  | Winding heating test |  |  | C | C |
|  |  | Adhesion of electric wire after electric wire production |  |  | C | C |
|  |  | Extrusion outer appearance |  | C | A | C |
|  |  | Tensile strength (MPa) |  |  |  |  |
|  |  | Tensile elongation (%) |  |  |  |  |
|  | Heat aging test | Tensile strength retention rate (%) |  |  |  |  |
|  | (236° C. × 168 hr) | Tensile elongation retention rate (%) |  |  |  |  |

Note:
"Et-FEP copolymer" stands for Ethylene-FEP copolymer.

TABLE 3

|  |  |  |  | Comparative example | | |
|---|---|---|---|---|---|---|
|  |  |  |  | 4 | 5 | 6 |
| Silane MB | Base rubber | Fluorocarbon rubber | AFLAS 150P |  |  | 90 |
|  |  | Fluorocarbon rubber | AFLAS 150E | 50 |  |  |
|  |  | Fluorocarbon rubber | DAI-EL G801 |  |  |  |
|  |  | Fluorocarbon rubber | Viton GBL200 |  | 90 |  |
|  |  | Fluorocarbon rubber | Viton GBL900 |  |  |  |
|  |  | Fluorocarbon rubber | Viton A500 |  |  |  |
|  |  | EVA | VF120T |  |  |  |
|  |  | EVA | Evaflex EV360 |  |  |  |
|  |  | EEA | NUC6510 |  |  |  |
|  |  | EVA | Evaflex EV180 | 40 |  |  |
|  |  | Acrylic rubber | Vamac DP |  |  |  |
|  |  | Et-FEP copolymer | RP4020 (mp 160° C.) |  |  |  |
|  | Organic peroxide |  | PERHEXA 25B | 0.05 | 0.05 | 0.05 |
|  | Inorganic filler | Zinc oxide | Zinc Oxide No. 1 | 4 | 4 | 4 |
|  |  | Calcium carbonate | SOFTON 1200 | 300 | 100 | 100 |
|  |  | Silica | Aerosil 200 |  |  |  |
|  |  | Silica | CRYSTALITE 5X |  |  |  |
|  |  | Calcined clay | Satitone SP-33 | 150 |  |  |
|  |  | Talc | MVTalc |  |  |  |
|  | Silane coupling agent | Vinyltrimethoxysilane | KBM-1003 | 7 | 16 | 1 |
|  |  | Vinyltriethoxysilane | KBE-1003 |  | 4 |  |
| Catalyst MB | Carrier rubber | Fluorocarbon rubber | AFLAS 150P | 10 | 10 | 10 |
|  |  | Fluorocarbon rubber | DAI-EL G801 |  |  |  |
|  |  | Fluorocarbon rubber | Viton GBL200 |  |  |  |
|  |  | Fluorocarbon rubber | Viton A500 |  |  |  |
|  |  | Et-FEP copolymer | RP4020 (mp 160° C.) |  |  |  |
|  |  | ETFE resin | LH-8000 (mp 180° C.) |  |  |  |
|  |  | ETFE resin | EP610 (mp 180° C.) |  |  |  |
|  |  | PVDF resin | KAYNER740 (mp 170° C.) |  |  |  |
|  | Silanol condensation catalyst | Dioctyltin dilaurate | ADKSTAB OT-1 | 0.05 | 0.05 | 0.05 |
|  | Antioxidizing agent |  | IRGANOX 1010 | 0.1 | 0.1 | 0.1 |
|  | Mixed at extrusion | ETFE resin | EP521 (mp 260° C.) |  |  |  |
|  |  | Et-FEP copolymer | RP4020 (160° C.) |  |  |  |
| Evaluation |  |  | Heat deformation test (%) | 62 | 40 | 83 |
|  |  |  | Hot set test | C | C | C |
|  |  |  | Winding heating test | C | B | C |
|  |  |  | Adhesion of electric wire after electric wire production | B | B | C |
|  |  |  | Extrusion outer appearance | C | C | A |
|  |  |  | Tensile strength (MPa) |  |  |  |
|  |  |  | Tensile elongation (%) |  |  |  |
|  | Heat aging test (236° C. × 168 hr) |  | Tensile strength retention rate (%) |  |  |  |
|  |  |  | Tensile elongation retention rate (%) |  |  |  |

|  |  |  |  | This invention | | | | | |
|---|---|---|---|---|---|---|---|---|---|
|  |  |  |  | 13 | 14 | 15 | 16 | 17 | 18 |
| Silane MB | Base rubber | Fluorocarbon rubber | AFLAS 150P | 70 |  | 60 | 50 | 40 | 60 |
|  |  | Fluorocarbon rubber | AFLAS 150E |  |  |  |  |  |  |
|  |  | Fluorocarbon rubber | DAI-EL G801 |  |  |  |  |  |  |
|  |  | Fluorocarbon rubber | Viton GBL200 |  | 60 |  |  |  |  |
|  |  | Fluorocarbon rubber | Viton GBL900 |  |  |  |  |  |  |
|  |  | Fluorocarbon rubber | Viton A500 |  |  |  |  |  |  |
|  |  | EVA | VF120T | 20 | 20 | 20 |  |  | 20 |
|  |  | EVA | Evaflex EV360 |  |  |  |  |  |  |
|  |  | EEA | NUC6510 |  |  |  | 20 | 20 |  |
|  |  | EVA | Evaflex EV180 |  |  |  |  |  |  |
|  |  | Acrylic rubber | Vamac DP |  |  |  |  |  |  |
|  |  | Et-FEP copolymer | RP4020 (mp 160° C.) |  |  |  |  |  |  |
|  | Organic peroxide |  | PERHEXA 25B | 0.1 | 0.1 | 0.1 | 0.1 | 0.1 | 0.1 |
|  | Inorganic filler | Zinc oxide | Zinc Oxide No. 1 | 10 | 10 | 10 | 10 | 10 | 10 |
|  |  | Calcium carbonate | SOFTON 1200 |  |  |  |  |  |  |
|  |  | Silica | Aerosil 200 |  |  |  |  |  |  |
|  |  | Silica | CRYSTALITE 5X | 60 | 60 | 60 | 60 | 60 | 60 |
|  |  | Calcined clay | Satitone SP-33 |  |  |  |  |  |  |
|  |  | Talc | MVTalc |  |  |  |  |  |  |
|  | Silane coupling agent | Vinyltrimethoxysilane | KBM-1003 | 12 | 12 | 12 | 12 | 12 | 12 |
|  |  | Vinyltriethoxysilane | KBE-1003 |  |  |  |  |  |  |

TABLE 3-continued

| | | | | | | | | | | |
|---|---|---|---|---|---|---|---|---|---|---|
| Catalyst MB | Carrier rubber | Fluorocarbon rubber | AFLAS 150P | 5 | 5 | | | | | |
| | | Fluorocarbon rubber | DAI-EL G801 | | | | | | | |
| | | Fluorocarbon rubber | Viton GBL200 | | | | | | | |
| | | Fluorocarbon rubber | Viton A500 | | | | | | | |
| | | Et-FEP copolymer | RP4020 (mp 160° C.) | 5 | 15 | 20 | 30 | 40 | | |
| | | ETFE resin | LH-8000 (mp 180° C.) | | | | | | 20 | |
| | | ETFE resin | EP610 (mp 180° C.) | | | | | | | |
| | | PVDF resin | KAYNER740 (mp 170° C.) | | | | | | | |
| | Silanol condensation catalyst | Dioctyltin dilaurate | ADKSTAB OT-1 | 0.05 | 0.05 | 0.05 | 0.05 | 0.05 | 0.05 | |
| | Antioxidizing agent | | IRGANOX 1010 | 0.1 | 0.1 | 0.1 | 0.1 | 0.1 | 0.1 | |
| | Mixed at extrusion | ETFE resin | EP521 (mp 260° C.) | | | | | | | |
| | | Et-FEP copolymer | RP4020 (160° C.) | | | | | | | |
| Evaluation | | | Heat deformation test (%) | 22 | 16 | 14 | 14 | 12 | 20 | |
| | | | Hot set test | A | A | A | A | A | A | |
| | | | Winding heating test | A | A | A | A | A | A | |
| | | | Adhesion of electric wire after electric wire production | A | A | A | A | A | A | |
| | | | Extrusion outer appearance | A | A | A | A | B | A | |
| | | | Tensile strength (MPa) | 8.5 | 9.2 | 10.4 | 12.4 | 13.9 | 11.2 | |
| | | | Tensile elongation (%) | 230 | 230 | 210 | 200 | 180 | 180 | |
| | Heat aging test | Tensile strength retention rate (%) | | 123 | 125 | 126 | 128 | 125 | 125 | |
| | (236° C. × 168 hr) | Tensile elongation retention rate (%) | | 81 | 78 | 80 | 78 | 75 | 73 | |

Note:
"Et-FEP copolymer" stands for Ethylene-FEP copolymer.

TABLE 4

| | | | | This invention | | | | | |
|---|---|---|---|---|---|---|---|---|---|
| | | | | 19 | 20 | 21 | 22 | 23 | 27 |
| Silane MB | Base rubber | Fluorocarbon rubber | AFLAS 150P | 60 | 60 | 60 | 60 | 50 | 60 |
| | | Fluorocarbon rubber | AFLAS 150E | | | | | | |
| | | Fluorocarbon rubber | DAI-EL G801 | | | | | | |
| | | Fluorocarbon rubber | Viton GBL200 | | | | | | |
| | | Fluorocarbon rubber | Viton GBL900 | | | | | | |
| | | Fluorocarbon rubber | Viton A500 | | | | | | |
| | | EVA | VF120T | | 20 | 20 | 20 | 20 | 20 |
| | | EVA | Evaflex EV360 | | | | | | |
| | | EEA | NUC6510 | 20 | | | | | |
| | | EVA | Evaflex EV180 | | | | | | |
| | | Acrylic rubber | Vamac DP | | | | | | |
| | | Et-FEP copolymer | RP4020 (mp 160° C.) | | | | | 10 | 10 |
| | Organic peroxide | | PERHEXA 25B | 0.1 | 0.1 | 0.1 | 0.1 | 0.1 | 0.1 |
| | Inorganic filler | Zinc oxide | Zinc Oxide No. 1 | 10 | 10 | 10 | 10 | 10 | 10 |
| | | Calcium carbonate | SOFTON 1200 | | | | | | |
| | | Silica | Aerosil 200 | | | | | | |
| | | Silica | CRYSTALITE 5X | 60 | 60 | 60 | 60 | 60 | 60 |
| | | Calcined clay | Satitone SP-33 | | | | | | |
| | | Talc | MVTalc | | | | | | |
| | Silane coupling agent | Vinyltrimethoxysilane | KBM-1003 | 12 | 12 | 12 | 12 | 12 | 12 |
| | | Vinyltriethoxysilane | KBE-1003 | | | | | | |
| Catalyst MB | Carrier rubber | Fluorocarbon rubber | AFLAS 150P | | | | 10 | 10 | 10 |
| | | Fluorocarbon rubber | DAI-EL G801 | | | | | | |
| | | Fluorocarbon rubber | Viton GBL200 | | | | | | |
| | | Fluorocarbon rubber | Viton A500 | | | | | | |
| | | Et-FEP copolymer | RP4020 (mp 160° C.) | | | | | | |
| | | ETFE resin | LH-8000 (mp 180° C.) | | | | | | |
| | | ETFE resin | EP610 (mp 180° C.) | | | 20 | | 10 | |
| | | PVDF resin | KAYNER740 (mp 170° C.) | | | | 20 | | |
| | Silanol condensation catalyst | Dioctyltin dilaurate | ADKSTAB OT-1 | 0.05 | 0.05 | 0.05 | 0.05 | 0.05 | 0.05 |
| | Antioxidizing agent | | IRGANOX 1010 | 0.1 | 0.1 | 0.1 | 0.1 | 0.1 | 0.1 |
| | Mixed at extrusion | ETFE resin | EP521 (mp 260° C.) | 20 | | | | | |
| | | Et-FEP copolymer | RP4020 (160° C.) | | | | | | 10 |
| Evaluation | | | Heat deformation test (%) | 22 | 21 | 25 | 24 | 23 | 21 |
| | | | Hot set test | A | A | A | A | A | A |
| | | | Winding heating test | A | A | A | A | A | A |
| | | | Adhesion of electric wire after electric wire production | A | A | A | A | A | A |

TABLE 4-continued

| | | This invention | | | | | |
|---|---|---|---|---|---|---|---|
| | | 19 | 20 | 21 | 22 | 23 | 27 |
| | Extrusion outer appearance | B | A | A | B | B | A |
| | Tensile strength (MPa) | 8 | 12.2 | 8.6 | 8 | 8.4 | 8.4 |
| | Tensile elongation (%) | 110 | 180 | 160 | 130 | 140 | 240 |
| Heat aging test (236° C. × 168 hr) | Tensile strength retention rate (%) | 130 | 124 | 130 | 128 | 132 | 121 |
| | Tensile elongation retention rate (%) | 72 | 78 | 68 | 68 | 66 | 83 |

Note:
"Et-FEP copolymer" stands for Ethylene-FEP copolymer.

As is apparent from the results shown in Tables 1 to 4, all in Examples 1 to 27 passed the heat deformation test, the hot set test and the winding heating test. Thus, according the present invention, the electric wire having the crosslinked fluorocarbon rubber formed body which was excellent in heat resistance and was not melted even at a high temperature as the coating was able to be produced. Furthermore, it is found that the crosslinked fluorocarbon rubber formed body contains the crosslinked body of the fluorocarbon rubber, and therefore is excellent also in oil resistance. Further, the electric wires in Examples 1 to 27 passed also the outer appearance test, and the electric wire having the crosslinked fluorocarbon rubber formed body having excellent outer appearance as the coating was able to be produced. In particular, if the resin of the ethylene-vinyl acetate copolymer is simultaneously used, it is found that by far higher heat resistance can be provided. In addition, all in Examples 1, 2, 12 to 23 and 27 exhibited excellent results in the heat aging test, and had long-term heat resistance.

Further, Examples 13 to 23 and 27 all containing the fluorocarbon resins were excellent in tensile strength and excellent in mechanical characteristics.

In contrast, in Comparative Example 1 in which the content of the organic peroxide was excessively large, even extrusion forming was unable to be performed. Comparative Example 2 in which the content of the organic peroxide was excessively small, failed to pass the heat deformation test, the hot set test, and the winding heating test. Even when the content of the inorganic filler was excessively small (Comparative Example 3) or when the content of the inorganic filler was excessively large (Comparative Example 4), these examples failed to pass the heat deformation test, the hot set test, and the winding heating test. Comparative Example 5 in which the content of the silane coupling agent was excessively large, failed to pass the hot set test, and Comparative Example 6 in which the content of the silane coupling agent was excessively small, failed to pass the heat deformation test and the winding heating test.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method for producing a heat-resistant crosslinked fluorocarbon rubber formed body, comprising:
   (a) melt-kneading a mixture comprising a base rubber and 0.003 to 0.5 part by mass of an organic peroxide, 0.5 to 400 parts by mass of an inorganic filler, and more than 2.0 parts by mass and 15.0 parts by mass or less of a silane coupling agent, with respect to 100 parts by mass of of the base rubber, at a temperature equal to or higher than a decomposition temperature of the organic peroxide, to prepare a silane master batch, wherein the base rubber contains a fluorocarbon rubber and a resin selected from the group consisting of an ethylene-vinyl acetate copolymer, an ethylene-(meth)acrylate copolymer, an ethylene-(meth)acrylic acid copolymer, an acrylic rubber, and combinations thereof;
   (b) mixing the silane master batch obtained in the step (a) with a silanol condensation catalyst, and then forming the resultant mixture; and
   (c) bringing the formed body obtained in the step (b) into contact with moisture, to cause silane crosslinking.

2. The method for producing the heat-resistant crosslinked fluorocarbon rubber formed body described in the claim 1, wherein the fluorocarbon rubber is tetrafluoroethylene-propylene copolymer rubber.

3. The method for producing the heat-resistant crosslinked fluorocarbon rubber formed body described in claim 1, wherein a content of the organic peroxide is 0.005 to 0.5 part by mass.

4. The method for producing the heat-resistant crosslinked fluorocarbon rubber formed body described in claim 1, wherein a content of the silane coupling agent is 3 to 12.0 parts by mass.

5. The method for producing the heat-resistant crosslinked fluorocarbon rubber formed body described in claim 1, wherein a content of the silane coupling agent is 4 to 12.0 parts by mass.

6. The method for producing the heat-resistant crosslinked fluorocarbon rubber formed body described in claim 1, wherein the silane coupling agent is vinyltrimethoxysilane or vinyltriethoxysilane.

7. The method for producing the heat-resistant crosslinked fluorocarbon rubber formed body described in claim 1, wherein the inorganic filler is silica, calcium carbonate, zinc oxide or calcined clay, or any combination of these.

8. The method for producing the heat-resistant crosslinked fluorocarbon rubber formed body described in claim 1, wherein melt-kneading in the step (a) is performed by using an enclosed mixer.

9. The method for producing the heat-resistant crosslinked fluorocarbon rubber formed body described in claim 1, wherein a fluorocarbon resin is contained in the base rubber.

10. The method for producing the heat-resistant crosslinked fluorocarbon rubber formed body described in claim 9, wherein a melting point of the fluorocarbon resin is 250° C. or lower.

11. The method for producing the heat-resistant crosslinked fluorocarbon rubber formed body described in claim 9, wherein a melting point of the fluorocarbon resin is 200° C. or lower.

12. The method for producing the heat-resistant crosslinked fluorocarbon rubber formed body described in claim 9, wherein the fluorocarbon resin contains an ethylene-tetrafluoroethylene-hexafluoropropylene copolymer resin, an ethylene-tetrafluoroethylene copolymer resin or a polyvinylidene fluoride resin, or any combination of these.

13. The method for producing the heat-resistant crosslinked fluorocarbon rubber formed body described in claim 9, wherein a percentage content of the fluorocarbon resin is 3 to 45% by mass in 100% by mass of the base rubber.

14. The method for producing the heat-resistant crosslinked fluorocarbon rubber formed body described in claim 1, wherein part of the base rubber is melt-mixed in the step (a), a remainder of the base rubber is mixed in the step (b), and a fluorocarbon resin is contained in the remainder of the base rubber.

15. A heat-resistant crosslinked fluorocarbon rubber formed body, produced according to the method for producing the heat-resistant crosslinked fluorocarbon rubber formed body described in claim 1.

16. The heat-resistant crosslinked fluorocarbon rubber formed body described in claim 15, formed by crosslinking the base rubber with the inorganic filler through a silanol bond.

17. A heat-resistant product, comprising the heat-resistant crosslinked fluorocarbon rubber formed body described in claim 15.

18. The heat-resistant product described in claim 17, wherein the heat-resistant crosslinked fluorocarbon rubber formed body is a coating of an electric wire or an optical fiber cable.

19. A master batch mixture, comprising a silane master batch and a silanol condensation catalyst, wherein the silane master batch is prepared by mixing 0.003 to 0.5 part by mass of an organic peroxide, 0.5 to 400 part by mass of an inorganic filler, more than 2.0 parts by mass and 15.0 parts by mass or less of a silane coupling agent, with respect to 100 parts by mass of a base rubber containing a fluorocarbon rubber, and a silanol condensation catalyst, wherein the silane master batch is obtained by melt-kneading all or part of the base rubber, the organic peroxide, the inorganic filler and the silane coupling agent, at a temperature equal to or higher than a decomposition temperature of the organic peroxide.

20. A formed body, formed by introducing a master batch mixture obtained by dry-blending a silane master batch and a silanol condensation catalyst, into a forming machine, wherein the silane master batch is prepared by mixing 0.003 to 0.5 part by mass of an organic peroxide, 0.5 to 400 part by mass of an inorganic filler, more than 2.0 parts by mass and 15.0 parts by mass or less of a silane coupling agent, with respect to 100 parts by mass of a base rubber containing a fluorocarbon rubber, and a silanol condensation catalyst, wherein the silane master batch is obtained by melt-kneading all or part of the base rubber, the organic peroxide, the inorganic filler and the silane coupling agent, at a temperature equal to or higher than a decomposition temperature of the organic peroxide.

* * * * *